US012548504B2

(12) United States Patent
Wang et al.

(10) Patent No.: US 12,548,504 B2
(45) Date of Patent: Feb. 10, 2026

(54) DRIVING CIRCUIT, DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Benlian Wang, Beijing (CN); Yao Huang, Beijing (CN); Bo Zhang, Beijing (CN); Hai Zheng, Beijing (CN); Ming Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/553,728

(22) PCT Filed: Oct. 31, 2022

(86) PCT No.: PCT/CN2022/128610

§ 371 (c)(1),
(2) Date: Oct. 2, 2023

(87) PCT Pub. No.: WO2024/092400

PCT Pub. Date: May 10, 2024

(65) Prior Publication Data

US 2025/0252913 A1 Aug. 7, 2025

(51) Int. Cl.
*G09G 3/3225* (2016.01)

(52) U.S. Cl.
CPC ................................ *G09G 3/3225* (2013.01)

(58) Field of Classification Search
CPC .......... G09G 3/3225–3266; G09G 2310/0286
See application file for complete search history.

(56) References Cited

U.S. PATENT DOCUMENTS

2014/0055444 A1 2/2014 Jang
2016/0365052 A1 12/2016 Park et al.
(Continued)

FOREIGN PATENT DOCUMENTS

CN 103632633 B 8/2016
CN 110956919 A 4/2020
(Continued)

*Primary Examiner* — Hang Lin
(74) *Attorney, Agent, or Firm* — McCoy Russell LLP

(57) ABSTRACT

A driving circuit, a display panel and a display device are provided. The driving circuit includes a first output circuit and a first pull-up node control circuit; the first output circuit is electrically connected to a pull-up node, a first high voltage input terminal and a driving signal output terminal, and is configured to control to connect the first high voltage input terminal and the driving signal output terminal under the control of a potential of the pull-up node; the first pull-up node control circuit is electrically connected to a pull-down node, a second high voltage input terminal and the pull-up node, and is configured control to connect the pull-up node and the second high voltage input terminal under the control of a potential of the pull-down node; the first high voltage input terminal is different from the second high voltage input terminal.

17 Claims, 18 Drawing Sheets

(56) References Cited

U.S. PATENT DOCUMENTS

| | | | |
|---|---|---|---|
| 2021/0193007 A1 | 6/2021 | Cheng et al. | |
| 2021/0193025 A1* | 6/2021 | Xu | G09G 3/3266 |
| 2021/0366402 A1 | 11/2021 | In et al. | |
| 2022/0246101 A1 | 8/2022 | Long et al. | |
| 2022/0375395 A1* | 11/2022 | Zhao | G09G 3/3233 |

FOREIGN PATENT DOCUMENTS

| | | |
|---|---|---|
| CN | 210956110 U | 7/2020 |
| CN | 111524486 A | 8/2020 |
| CN | 112652271 A | 4/2021 |
| CN | 113178221 A | 7/2021 |
| CN | 113707097 A | 11/2021 |
| CN | 214588040 U | 11/2021 |
| CN | 114842901 A | 8/2022 |

* cited by examiner

DRIVING CIRCUIT, DISPLAY PANEL AND DISPLAY DEVICE

TECHNICAL FIELD

The present disclosure relates to the field of display technology, in particular to a driving circuit, a display panel and a display device.

BACKGROUND

The active matrix organic light-emitting diode (AMOLED) display device is widely used in various products due to the advantages of bendable, high contrast and low power consumption, and so on.

In related technologies, the AMOLED display device usually includes: AMOLED display panel and gate driving circuit. The AMOLED display panel includes a plurality of rows of pixels. The gate driving circuit includes a plurality of shift register units connected in series. Each shift register unit is coupled to a row of pixels, and is used to transmit a gate driving signal to the row of pixels to drive the row of pixels to emit light. The plurality of shift register units connected in series can implement progressive scanning on the plurality of rows of pixels, to make the AMOLED display panel to display an image.

However, the relevant shift register unit adopts the same voltage input terminal, the potential of each node cannot be set flexibly.

SUMMARY

In one aspect, the present disclosure provides in some embodiments a driving circuit, including a first output circuit and a first pull-up node control circuit; the first output circuit is electrically connected to a pull-up node, a first high voltage input terminal and a driving signal output terminal, and is configured to control to connect the first high voltage input terminal and the driving signal output terminal under the control of a potential of the pull-up node; the first pull-up node control circuit is electrically connected to a pull-down node, a second high voltage input terminal and the pull-up node, and is configured control to connect the pull-up node and the second high voltage input terminal under the control of a potential of the pull-down node; the first high voltage input terminal is different from the second high voltage input terminal.

Optionally, the driving circuit further includes a first pull-down node control circuit; wherein the first pull-down node control circuit is electrically connected to the pull-down node, a third high voltage input terminal and a pull-down control terminal respectively, and is configured to control to connect the third high voltage input terminal and the pull-down node under the control of a pull-down control signal provided by the pull-down control terminal; the third high voltage input terminal is different from at least one of the first high voltage input terminal and the second high voltage input terminal.

Optionally, the driving circuit further includes a first node control circuit and a fourth high voltage input terminal; wherein the first node control circuit is electrically connected to a first node, a first control terminal and the fourth high voltage input terminal, and is configured to control to connect the first node and the fourth high voltage input terminal under the control of a potential of the first control terminal; the first control terminal is a first control node or a second control node; the fourth high voltage input terminal is different from at least one of the first high voltage input terminal and the second high voltage input terminal.

Optionally, the driving circuit further includes a second output circuit, a second pull-down node control circuit, and a first control node control circuit; wherein the second output circuit is electrically connected to the pull-down node, the driving signal output terminal and a first low voltage input terminal respectively, and is configured to control to connect the driving signal output terminal and the first low voltage input terminal under the control of the potential of the pull-down node; the second pull-down node control circuit is electrically connected to a third control node, the pull-down node and a second low voltage input terminal, and is configured to control to connect the third control node and the pull-down node under the control of a low voltage signal provided by the second low voltage input terminal; the first control node control circuit is respectively electrically connected to a first clock signal terminal, a third low voltage input terminal and a first control node, and is configured to control to connect the first control node and the third low voltage input terminal under the control of a first clock signal provided by the first clock signal terminal; at least two of the first low voltage input terminal, the second low voltage input terminal and the third low voltage input terminal are different from each other.

Optionally, the driving circuit further includes the second control node control circuit; wherein the second control node control circuit is electrically connected to a fourth low voltage input terminal, the first control node and the second control node respectively, and is configured to control to connect the first control node and the second control node under the control of a low voltage signal provided by the fourth low voltage input terminal.

Optionally, the fourth low voltage input terminal is different from at least one of the first low voltage input terminal, the second low voltage input terminal, and the third low voltage input terminal.

Optionally, the driving circuit further includes a third pull-down node control circuit; wherein the third pull-down node control circuit is electrically connected to the first node and a second clock signal terminal respectively, and is configured to control to connect or disconnect the first node and the second clock signal terminal.

Optionally, the third pull-down node control circuit is also connected to the pull-down node, the second node, the third node, a fifth low voltage input terminal, the first clock signal terminal and a start signal terminal respectively, and is configured to connect the first node and the second clock signal terminal under the control of the potential of the second node, and control the potential of the second node according to the potential of the first node, control to connect the start signal terminal and the third node under the control of the first clock signal provided by the first clock signal terminal, and control to connect the third node and the second node under the control of a low voltage signal provided by the fifth low voltage input terminal, and control to connect the second node and the pull-down node under the control of the potential of the second node.

Optionally, the fifth low voltage input terminal is different from at least one of the first low voltage input terminal, the second low voltage input terminal, or the third low voltage input terminal.

Optionally, the first output circuit includes a first transistor, the first pull-up node control circuit includes a second transistor, and the first pull-down node control circuit includes a third transistor; a control electrode of the first transistor is electrically connected to the pull-up node, a first electrode of the first transistor is electrically connected to the first high voltage input terminal, and a second electrode of the first transistor is electrically connected to the driving signal output terminal; a control electrode of the second transistor is electrically connected to the pull-down node, a first electrode of the second transistor is electrically connected to the second high voltage input terminal, and a second electrode of the second transistor is electrically connected to the pull-up node; a control electrode of the third transistor is electrically connected to the pull-down control terminal, a first electrode of the third transistor is electrically connected to the third high voltage input terminal, and a second electrode of the third transistor is electrically connected to the pull-down node; the first high voltage input terminal is a first high voltage terminal, and the second high voltage input terminal and the third high voltage input terminal are a second high voltage terminal; or, the first high voltage input terminal is the second high voltage terminal, and the second high voltage input terminal and the third high voltage input terminal are the first high voltage terminal; or, the first high voltage input terminal is the first high voltage terminal, the second high voltage input terminal is the second high voltage terminal, and the third high voltage input terminal is a third high voltage terminal; or, the first high voltage input terminal and the third high voltage input terminal are the first high voltage terminal, and the second high voltage input terminal is the second high voltage terminal.

Optionally, the first node control circuit includes a fourth transistor; a control electrode of the fourth transistor is electrically connected to the first control node, a first electrode of the fourth transistor is electrically connected to the fourth high voltage input terminal, and a second electrode of the fourth transistor is electrically connected to the first node; the first high voltage input terminal, the third high voltage input terminal and the fourth high voltage input terminal are the first high voltage terminal, and the second high voltage input terminal is the second high voltage terminal; or, the first high voltage input terminal and the fourth high voltage input terminal are the first high voltage terminal, and the second high voltage input terminal and the third high voltage input terminal are the second high voltage terminal; or, the first high voltage input terminal and the third high voltage input terminal are the first high voltage terminal, and the second high voltage input terminal and the fourth high voltage input terminal are the second high voltage terminal; or, the first high voltage input terminal is the first high voltage terminal, and the second high voltage input terminal, the third high voltage input terminal and the fourth high voltage input terminal are the second high voltage terminal.

Optionally, the second output circuit includes a fifth transistor, the second pull-down node control circuit includes a sixth transistor, and the first control node control circuit includes a seventh transistor; a control electrode of the fifth transistor is electrically connected to the pull-down node, a first electrode of the fifth transistor is electrically connected to the driving signal output terminal, and a second electrode of the fifth transistor is electrically connected to the first low voltage input terminal; a control electrode of the sixth transistor is electrically connected to the second low voltage input terminal, a first electrode of the sixth transistor is electrically connected to the third control node, and a second electrode of the sixth transistor is electrically connected to the pull-down node; a control electrode of the seventh transistor is electrically connected to the first clock signal terminal, a first electrode of the seventh transistor is electrically connected to the third low voltage input terminal, and a second electrode of the seventh transistor is electrically connected to the first control node; the first low voltage input terminal and the second low voltage input terminal are the first low voltage terminal; the third low voltage input terminal is the second low voltage terminal; or, the first low voltage input terminal is the first low voltage terminal, and the second low voltage input terminal and the third low voltage input terminal are the second low voltage terminal.

Optionally, the second control node control circuit includes an eighth transistor; a control electrode of the eighth transistor is electrically connected to the fourth low voltage input terminal, a first electrode of the eighth transistor is electrically connected to the first control node, and a second electrode of the eighth transistor is electrically connected to the second control node; the fourth low voltage input terminal is the first low voltage terminal or the second low voltage terminal.

Optionally, the third pull-down node control circuit includes a first capacitor, a ninth transistor, a tenth transistor, an eleventh transistor, and a twelfth transistor; a first terminal of the first capacitor is electrically connected to the first node, and a second terminal of the first capacitor is electrically connected to the second node; a control electrode of the ninth transistor is electrically connected to the second node, a first electrode of the ninth transistor is electrically connected to the first node, and a second electrode of the ninth transistor is electrically connected to the second clock signal terminal; a control electrode of the tenth transistor is electrically connected to the second node, a first electrode of the tenth transistor is electrically connected to the pull-down node, and a second electrode of the tenth transistor is electrically connected to the second node; a control electrode of the eleventh transistor is electrically connected to a fifth low voltage input terminal, a first electrode of the eleventh transistor is electrically connected to the third node, and a second electrode of the eleventh transistor is electrically connected to the second node; a control electrode of the twelfth transistor is electrically connected to the first clock signal terminal, a first electrode of the twelfth transistor is electrically connected to the start signal terminal, and a second electrode of the twelfth transistor is electrically connected to the third node.

Optionally, the fifth low voltage input terminal is the first low voltage terminal or the second low voltage terminal.

Optionally, the driving circuit includes a first control node control circuit, a third control node control circuit and a second pull-up node control circuit; the first control node control circuit is electrically connected to the first control node, and the first control node control circuit is also electrically connected to the third control node, is configured to control to connect the first control node and the first clock signal terminal under the control of a potential of the third control node; the third control node control circuit is electrically connected to the first clock signal terminal, the start signal terminal, and the third control node, and is configured to control to connect the start signal terminal and the third control node under the control of the first clock signal provided by the first clock signal terminal; the second pull-up node control circuit is also electrically connected to the first control node or the second control node, a fourth control node, the second clock signal terminal and the first high voltage input terminal, is configured to control a potential of the fourth control node according to the potential of the second control node, and control to connect the second clock signal terminal and the fourth control node under the control of the potential of the first control node or the potential of the second control node, control to connect the fourth control node and the pull-up node under the control of the second clock signal provided by the second clock signal terminal, and maintain the potential of the pull-up node.

Optionally, the first control node control circuit includes a thirteenth transistor, the third control node control circuit includes a fourteenth transistor, and the second pull-up node control circuit includes a second capacitor, a third capacitor, a fifteenth transistor and a sixteenth transistor; a control electrode of the thirteenth transistor is electrically connected to the third control node, a first electrode of the thirteenth transistor is electrically connected to the first control node, and a second electrode of the thirteenth transistor is electrically connected to the first clock signal terminal; a control electrode of the fourteenth transistor is electrically connected to the first clock signal terminal, a first electrode of the fourteenth transistor is electrically connected to the start signal terminal, and a second electrode of the fourteenth transistor is electrically connected to the third control node; a first terminal of the second capacitor is electrically connected to the second control node, and a second terminal of the second capacitor is electrically connected to the fourth control node; a first terminal of the third capacitor is electrically connected to the pull-up node, and a second terminal of the third capacitor is electrically connected to the first high voltage input terminal; a control electrode of the fifteenth transistor is electrically connected to the second control node, a first electrode of the fifteenth transistor is electrically connected to the second clock signal terminal, and a second electrode of the fifteenth transistor is electrically connected to the fourth control node; a control electrode of the sixteenth transistor is electrically connected to the second clock signal terminal, a first electrode of the sixteenth transistor is electrically connected to the fourth control node, and a second electrode of the sixteenth transistor is connected to the pull-up node.

In a second aspect, an embodiment of the present disclosure provides a driving circuit, including a second output circuit, a second pull node control circuit and a first control node control circuit; the second output circuit is electrically connected to a pull-down node, a driving signal output terminal and a first low voltage input terminal respectively, and is configured to control to connect the driving signal output terminal and the first low voltage input terminal under the control of a potential of the pull-down node; the second pull-down node control circuit is electrically connected to a third control node, the pull-down node and a second low voltage input terminal, and is configured to control to connect the third control node and the pull-down node under the control of a low voltage signal provided by the second low voltage input terminal; the first control node control circuit is respectively electrically connected to a first clock signal terminal, a third low voltage input terminal and a first control node, and is configured to control to connect the first control node and the third low voltage input terminal under the control of a first clock signal provided by the first clock signal terminal; at least two of the first low voltage input terminal, the second low voltage input terminal and the third low voltage input terminal are different from each other.

Optionally, the driving circuit further includes a second control node control circuit; the second control node control circuit is respectively electrically connected to a fourth low voltage input terminal, the first control node and the second control node, and is configured to control to connect the first control node and the second control node under the control of a low voltage signal provided by the fourth low voltage input terminal; the fourth low voltage input terminal is different from at least one of the first low voltage input terminal, the second low voltage input terminal, and the third low voltage input terminal.

Optionally, the driving circuit further includes a third pull-down node control circuit; the third pull-down node control circuit is electrically connected to a first node and a second clock signal terminal, and is configured to control to connect or disconnect the first node and the second clock signal terminal; the third pull-down node control circuit is also electrically connected to a second node, a third node, a fifth low voltage input terminal, the first clock signal terminal and a start signal terminal, and is configured to control to connect the first node and the second clock signal terminal under the control of a potential of the second node, and control the potential of the second node according to the potential of the first node, control to connect the start signal terminal and the third node under the control of the first clock signal provided by the first clock signal terminal, and control to connect the third node and the second node under the control of a low voltage signal provided by the fifth low voltage input terminal, and control to connect the second node and the pull-down node under the control of the potential of the second node; the fifth low voltage input terminal is different from at least one of the first low voltage input terminal, the second low voltage input terminal, the third low voltage input terminal, or the fourth low voltage input terminal.

In a third aspect, an embodiment of the present disclosure provides a display panel, including the driving circuit; wherein the display panel further includes a display driving IC; the first high voltage input terminal is electrically connected to a first high voltage line, and the second high voltage input terminal is electrically connected to a second high voltage line; the first high voltage line and the second high voltage line are respectively electrically connected to different pins of the display driving IC, the display driving IC is configured to provide a first high voltage signal to the first high voltage line, and the display driving IC is configured to provide a second high voltage signal to the second high voltage line.

In a fourth aspect, an embodiment of the present disclosure provides a display panel, comprising the driving circuit; wherein the display panel further includes a display driving IC; the first low voltage input terminal is electrically connected to a first low voltage line, the second low voltage input terminal is electrically connected to a second low voltage line, the third low voltage input terminal is electrically connected to a third low voltage line, and the first low voltage line, the second low voltage line, and the third low voltage line are electrically connected to different pins of the display driving IC, and the display driving IC is configured to provide a first low voltage signal for the first low voltage line, provide a second low voltage signal for the second low voltage line and provide a third low voltage signal for the third low voltage line; or, the first low voltage input terminal is electrically connected to the first low voltage line, the second low voltage input terminal and the third low voltage input terminal are both electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, both the first low voltage input terminal and the second low voltage input terminal are electrically connected to the first low voltage line, the third low voltage input terminal is electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, both the first low voltage input terminal and the third low voltage input terminal are electrically connected to the first low voltage line, the second low voltage input terminal is electrically connected to the second low voltage line, and the first low voltage line and the second low voltage line are respectively electrically connected to different pins of the display driving IC, and the display driving IC is configured to provide the first low voltage signal for the first low voltage line, and provide the second low voltage signal for the second low voltage line.

In a fifth aspect, an embodiment of the present disclosure provides a display device, including the driving circuit.

DETAILED DESCRIPTION

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
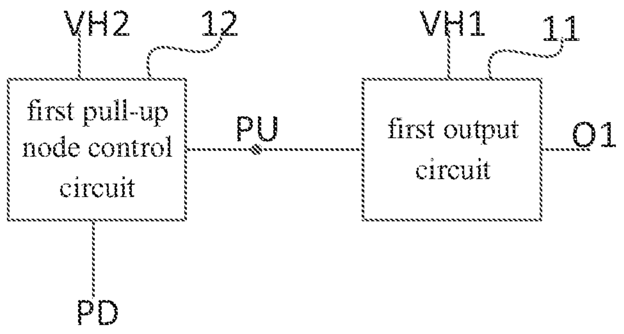
FIG. 1 is the structural diagram of the driving circuit according to an embodiment of the present disclosure.

As shown in FIG. 1, the driving circuit described in the embodiment of the present disclosure includes a first output circuit 11 and a first pull-up node control circuit 12;

The first output circuit 11 is electrically connected to a pull-up node PU, a first high voltage input terminal VH1 and a driving signal output terminal O1, and is configured to control to connect the first high voltage input terminal VH1 and the driving signal output terminal O1 under the control of a potential of the pull-up node PU;

The first pull-up node control circuit 12 is electrically connected to a pull-down node PD, a second high voltage input terminal VH2 and the pull-up node PU, and is configured control to connect the pull-up node PU and the second high voltage input terminal VH2 under the control of a potential of the pull-down node PD;

The first high voltage input terminal VH1 is different from the second high voltage input terminal VH2.

The driving circuit described in the embodiment of the present disclosure adopts two high voltage input terminals, so as to be able to flexibly control the potential of each node.

In at least one embodiment of the present disclosure, the two high voltage input terminals being different may refer to: the voltage values of the high voltage signals respectively provided by the two high voltage input terminals are different.

In at least one embodiment of the driving circuit shown in FIG. 1, the first high voltage input terminal VH1 electrically connected to the first output circuit 11 and the second high voltage input terminal VH2 electrically connected to the first pull-up node control circuit 12 are not same.

In specific implementation, when the transistors included in the first output circuit 11 are p-type transistors, the voltage value of the high voltage signal provided by the first high voltage input terminal can be set to be smaller than the voltage value of the high voltage signal provided by the second high voltage input terminal, so that when the transistor included in the first pull-up node control circuit 12 is turned on, the transistor included in the first output circuit 11 can be better turned off;

When the transistors included in the first output circuit 11 are n-type transistors, the voltage value of the high voltage signal provided by the first high voltage input terminal can be set to be greater than the voltage value of the high voltage signal provided by the second high voltage input terminal, so that when the transistor included in the first pull-up node control circuit 12 is turned on, the transistor included in the first output circuit 11 can be better turned off;

But not limited to this.

In at least one embodiment of the present disclosure, VH1 can provide the first high voltage signal VGH, and VH2 can provide the second high voltage signal VGH2; or, VH1 can provide the second high voltage signal VGH2, and VH2 can provide the first high voltage signal VGH; but not limited thereto.

In at least one embodiment of the present disclosure, the voltage value of the high voltage signal provided by each high voltage input terminal may be a positive value; the voltage value of the first high voltage signal VGH may be greater than the voltage value of the second high voltage signal VGH2, or, the voltage value of the first high voltage signal VGH may be smaller than the voltage value of the second high voltage signal VGH2.

In at least one embodiment of the present disclosure, the voltage value of the first high voltage signal VGH may be greater than or equal to 7V and less than or equal to 12V, for example, the voltage value of VGH may be about 9.5V.

Figure 2:
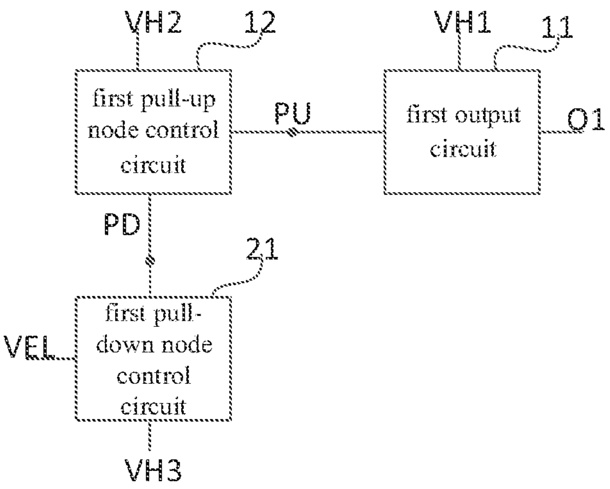
FIG. 2 is the structural diagram of the driving circuit according to an embodiment of the present disclosure.

As shown in FIG. 2, on the basis of the embodiment of the driving circuit shown in FIG. 1, the driving circuit described in at least one embodiment of the present disclosure further includes a first pull-down node control circuit 21;

The first pull-down node control circuit 21 is electrically connected to the pull-down node PD, a third high voltage input terminal VH3 and a pull-down control terminal VEL respectively, and is configured to control to connect the third high voltage input terminal VH3 and the pull-down node PD under the control of the pull-down control signal provided by the pull-down control terminal VEL;

The third high voltage input terminal VH3 is different from at least one of the first high voltage input terminal VH1 and the second high voltage input terminal VH2.

In at least one embodiment of the present disclosure, the driving circuit may further include a first pull-down node control circuit 21, which controls to connect the third high voltage input terminal VH3 and the pull-down node PD under the control of the pull-down control signal, the third high voltage input terminal VH3 is different from the first high voltage input terminal VH1; and/or, the third high voltage input terminal VH3 is different from the second high voltage input terminal VH2.

In a specific implementation, the pull-down control terminal VEL may write the high voltage signal provided by the third high voltage input terminal VH3 into the pull-down node PD before normal display, but not limited thereto.

In at least one embodiment of the present disclosure, the third high voltage input terminal VH3 may provide the first high voltage signal VGH or the second high voltage signal VGH2, but not limited thereto.

The driving circuit according to at least one embodiment of the present disclosure further includes a first node control circuit and a fourth high voltage input terminal;

The first node control circuit is electrically connected to the first node, the first control terminal and the fourth high voltage input terminal, and is configured to control to connect the first node and the fourth high voltage input terminal under the control of the potential of the first control terminal; the first control terminal is a first control node or a second control node;

The fourth high voltage input terminal is different from at least one of the first high voltage input terminal and the second high voltage input terminal.

In at least one embodiment of the present disclosure, the first node control circuit may be configured to control the potential of the first node, and the fourth high voltage input terminal electrically connected to the first node control circuit may be different from at least one of the first high voltage input terminal, the second high voltage input terminal, and the third high voltage input terminal.

Figure 3:
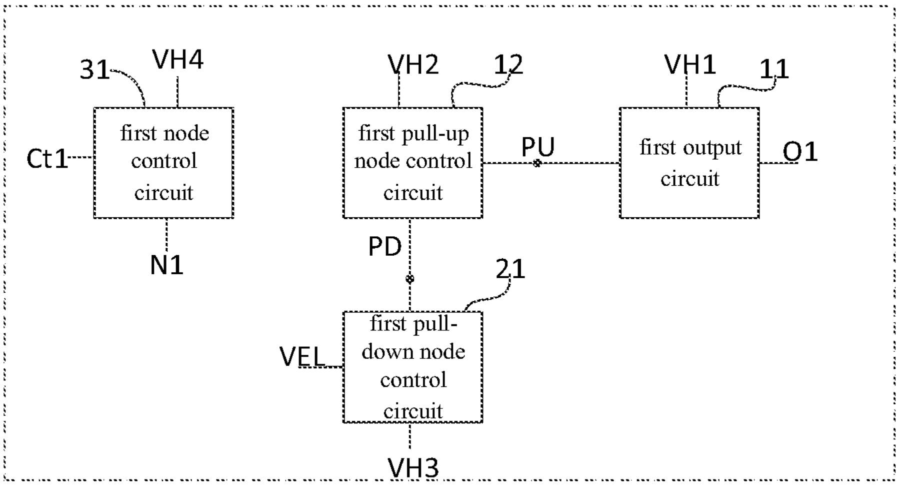
FIG. 3 is the structural diagram of the driving circuit according to an embodiment of the present disclosure.

As shown in FIG. 3, on the basis of at least one embodiment of the driving circuit shown in FIG. 2, the driving circuit described in at least one embodiment of the present disclosure further includes a first node control circuit 31 and a fourth high voltage input terminal VH4;

The first node control circuit 31 is electrically connected to the first node N1, the first control node Ct1 and the fourth high voltage input terminal VH4 respectively, and is configured to control to connect the first node N1 and the fourth high voltage input terminal VH4 under the control of the potential of the first control node Ct1.

In at least one embodiment of the driving circuit shown in FIG. 3, the fourth high voltage input terminal VH4 can provide the first high voltage signal VGH or the second high voltage signal VGH2, but not limited thereto.

In at least one embodiment of the present disclosure, the first high voltage input terminal VH1, the second high voltage input terminal VH2, the third high voltage input terminal VH3 and the fourth high voltage input terminal VH4 are not completely the same, specifically:

VH1 and VH2 are not the same; or,

VH1 and VH3 are not the same; or,

VH1 and VH4 are not the same; or,

VH2 and VH3 are not the same; or,

VH2 and VH4 are not the same; or,

VH3 and VH4 are not the same; or,

VH1, VH2, and VH3 are different from each other; or,

VH1, VH2 and VH4 are different from each other; or,
VH1, VH3 and VH4 are different from each other; or,
VH2, VH3 and VH4 are different from each other; or,
VH1, VH2, VH3 and VH4 are different from each other.

The driving circuit according to at least one embodiment of the present disclosure further includes a second output circuit, a second pull-down node control circuit, and a first control node control circuit;

The second output circuit is electrically connected to the pull-down node, the driving signal output terminal and the first low voltage input terminal respectively, and is configured to control to connect the driving signal output terminal and the first low voltage input terminal under the control of the potential of the pull-down node;

The second pull-down node control circuit is electrically connected to the third control node, the pull-down node and the second low voltage input terminal, and is configured to control to connect the third control node and the pull-down node under the control of the low voltage signal provided by the second low voltage input terminal;

The first control node control circuit is respectively electrically connected to a first clock signal terminal, a third low voltage input terminal and a first control node, and is configured to control to connect the first control node and the third low voltage input terminal under the control of the first clock signal provided by the first clock signal terminal;

At least two of the first low voltage input terminal, the second low voltage input terminal and the third low voltage input terminal are different from each other.

In at least one embodiment of the present disclosure, the two low voltage input terminals being different may refer to: the voltage values of the low voltage signals respectively provided by the two low voltage input terminals are different.

Figure 4:
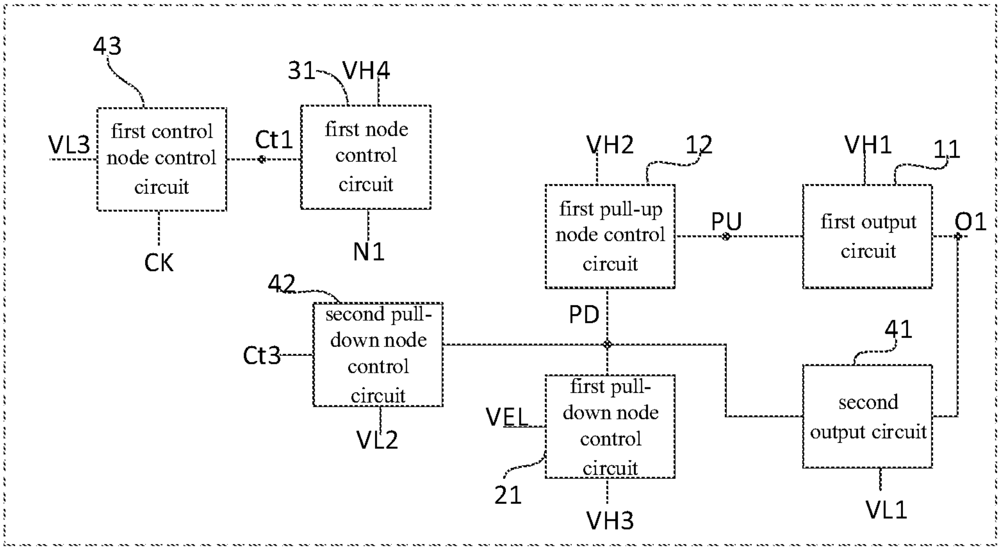
FIG. 4 is the structural diagram of the driving circuit according to an embodiment of the present disclosure.

As shown in FIG. 4, on the basis of at least one embodiment of the driving circuit shown in FIG. 3, the driving circuit described in at least one embodiment of the present disclosure further includes a second output circuit 41, a second pull-down node control circuit 42 and the first control node control circuit 43;

The second output circuit 41 is electrically connected to the pull-down node PD, the driving signal output terminal O1 and the first low voltage input terminal VL1, and is configured to control to connect the driving signal output terminal O1 and the first low voltage input terminal VL1 under the control of the potential of the pull-down node PD;

The second pull-down node control circuit 42 is electrically connected to the third control node Ct3, the pull-down node PD, and the second low voltage input terminal VL2, respectively, and is configured to control to connect the third control node Ct3 and the pull-down node PD under the control of the low voltage signal provided by the second low voltage input terminal VL2;

The first control node control circuit 43 is electrically connected to the first clock signal terminal CK, the third low voltage input terminal VL3 and the first control node Ct1 respectively, and is configured to control to connect the first control node Ct1 and the third low voltage input terminal VL3 under the control of the first clock signal provided by the first clock signal terminal CK;

At least two of the first low voltage input terminal VL1, the second low voltage input terminal VL2 and the third low voltage input terminal VL3 are different from each other.

In at least one embodiment of the driving circuit shown in FIG. 4, the first low voltage input terminal VL1 provides the first low voltage signal VGL, the second low voltage input terminal VL2 provides the first low voltage signal VGL, and the third low voltage input terminal VL3 provides the second low voltage signal VL2; or, The first low voltage input terminal VL1 provides the second low voltage signal VGL2, the second low voltage input terminal VL2 provides the first low voltage signal VGL, and the third low voltage input terminal VL3 provides the first low voltage signal VGL; or, The first low voltage input terminal VL1 provides a first low voltage signal VGL, the second low voltage input terminal VL2 provides a second low voltage signal VGL2, and the third low voltage input terminal VL3 provides a second low voltage signal VGL2;

But not limited to this.

In at least one embodiment of the present disclosure, the first low voltage input terminal VL1, the second low voltage input terminal VL2 and the third low voltage input terminal VL3 may also be the same, but not limited thereto.

In at least one embodiment of the present disclosure, the voltage value of the low voltage signal provided by each low voltage input terminal may be a negative value; the voltage value of the first low voltage signal VGL may be greater than the voltage value of the second low voltage signal VGL2, or, the voltage value of the first low voltage signal VGL may be smaller than the voltage value of the second low voltage signal VGL2.

In at least one embodiment of the present disclosure, the voltage value of the first low voltage signal VGL may be greater than or equal to −11V and less than or equal to −6V, for example, the voltage value of VGL may be about −8.5V, but not limited thereto.

Figure 5:
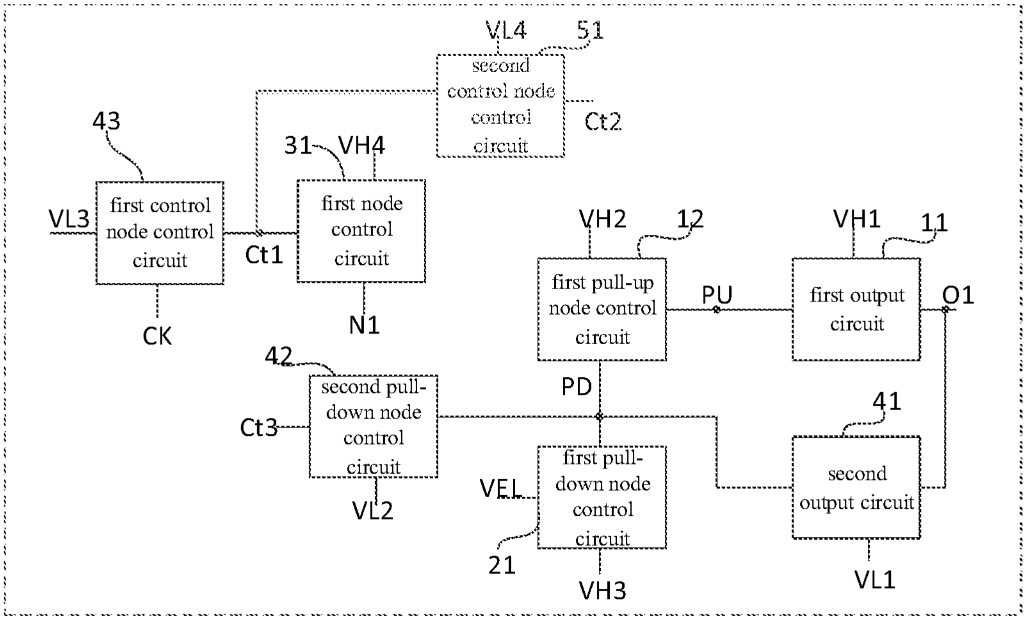
FIG. 5 is the structural diagram of the driving circuit according to an embodiment of the present disclosure.

As shown in FIG. 5, on the basis of at least one embodiment of the driving circuit shown in FIG. 4, the driving circuit described in at least one embodiment of the present disclosure further includes a second control node control circuit 51;

The second control node control circuit 51 is electrically connected to the fourth low voltage input terminal VL4, the first control node Ct1 and the second control node Ct2 respectively, and is configured to control to connect the first control node Ct1 and the second control node Ct2 under the control of the low voltage signal provided by the fourth low voltage input terminal VL4.

In at least one embodiment of the present disclosure, the fourth low voltage input terminal is different from at least one of the first low voltage input terminal, the second low voltage input terminal, and the third low voltage input terminal.

In at least one embodiment of the present disclosure, the fourth low voltage input terminal VL4 may provide the first low voltage signal VGL or the second low voltage signal VGL2, but not limited thereto.

Figure 6:
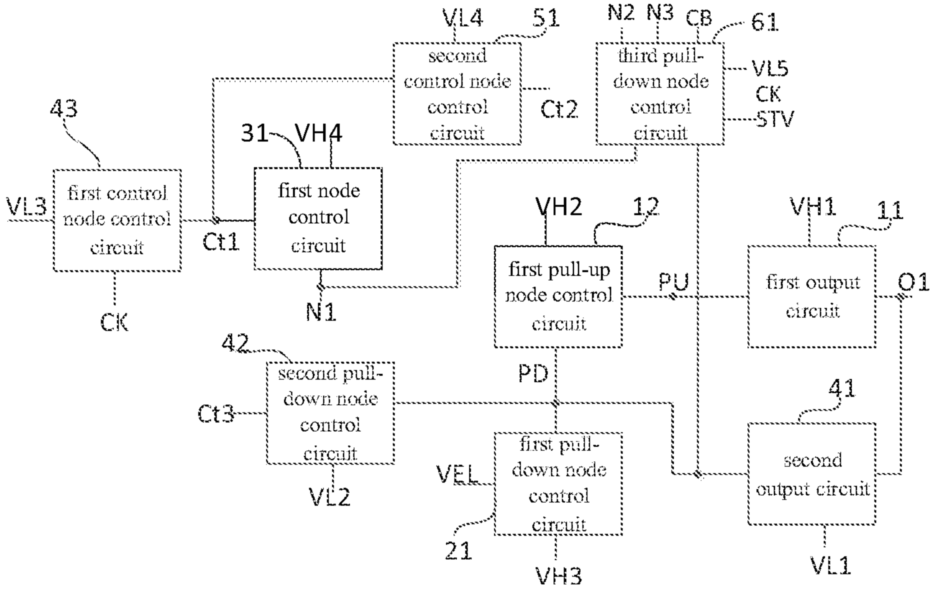
FIG. 6 is the structural diagram of the driving circuit according to an embodiment of the present disclosure.

As shown in FIG. 6, on the basis of at least one embodiment of the driving circuit shown in FIG. 5, the driving circuit described in at least one embodiment of the present disclosure further includes a third pull-down node control circuit 61;

The third pull-down node control circuit 61 is electrically connected to the first node N1 and the second clock signal terminal CB respectively, and is configured to control to connect or disconnect the first node N1 and the second clock signal terminal CB.

In a specific implementation, the driving circuit may further include a third pull-down node control circuit 61, configured to control the potential of the pull-down node PD.

As shown in FIG. 6, the third pull-down node control circuit 61 is also connected to the pull-down node PD, the second node N2, the third node N3, the fifth low voltage input terminal VL5, the first clock signal terminal CK and the start signal terminal STV respectively, and is configured to connect the first node N1 and the second clock signal terminal CB under the control of the potential of the second node N2, and control the potential of the second node N2 according to the potential of the first node N1, control to connect the start signal terminal STV and the third node N3 under the control of the first clock signal provided by the first clock signal terminal CK, and control to connect the third node N3 and the second node N2 under the control of the fifth low voltage signal provided by the fifth low voltage input terminal VL5, and control to connect the second node N2 and the pull-down node PD under the control of the potential of the second node N2.

In at least one embodiment of the present disclosure, the fifth low voltage input terminal is different from at least one of the first low voltage input terminal, the second low voltage input terminal, and the third low voltage input terminal.

In at least one embodiment of the present disclosure, the fifth low voltage input terminal may provide the first low voltage signal VGL or the second low voltage signal VGL2, but not limited thereto. In actual operation, the fifth low voltage input terminal can also provide other low voltage signals.

In at least one embodiment of the present disclosure, VL1, VL2, VL3, VL4 and VL5 are not completely the same; specifically:

VL1 and VL2 are not the same; or,
VL1 and VL3 are not the same; or,
VL1 and VL4 are not the same; or,
VL1 and VL5 are not the same; or,
VL2 and VL3 are not the same; or,
VL2 and VL4 are not the same; or,
VL2 and VL5 are not the same; or,
VL3 and VL4 are not the same; or,
VL3 and VL5 are not the same; or;
VL4 and VL5 are not the same; or;
VL1, VL2 and VL3 are different from each other; or;
VL1, VL2 and VL4 are different from each other; or,
VL1, VL2 and VL5 are different from each other; or,
VL1, VL3, and VL4 are different from each other; or,
VL1, VL3, and VL5 are different from each other; or,
VL1, VL4, and VL5 are different from each other; or,
VL2, VL3 and VL4 are different from each other; or,
VL2, VL3 and VL5 are different from each other; or,
VL2, VL4 and VL5 are different from each other; or;
VL1, VL2, VL3, and VL4 are different from each other; or,
VL1, VL2, VL3 and VL5 are different from each other; or,
VL1, VL3, VL4, and VL5 are different from each other; or,
VL2, VL3, VL4 and VL5 are different from each other; or,
VL1, VL2, VL3, VL4 and VL5 are different from each other.

Optionally, the first output circuit includes a first transistor, the first pull-up node control circuit includes a second transistor, and the first pull-down node control circuit includes a third transistor;

A control electrode of the first transistor is electrically connected to the pull-up node, a first electrode of the first transistor is electrically connected to the first high voltage input terminal, and a second electrode of the first transistor is electrically connected to the driving signal output terminal;

A control electrode of the second transistor is electrically connected to the pull-down node, a first electrode of the second transistor is electrically connected to the second high voltage input terminal, and a second electrode of the second transistor is electrically connected to the pull-up node;

A control electrode of the third transistor is electrically connected to the pull-down control terminal, a first electrode of the third transistor is electrically connected to the third high voltage input terminal, and a second electrode of the third transistor is electrically connected to the pull-down node;

The first high voltage input terminal is a first high voltage terminal, and the second high voltage input terminal and the third high voltage input terminal are a second high voltage terminal; or, The first high voltage input terminal is the second high voltage terminal, and the second high voltage input terminal and the third high voltage input terminal are the first high voltage terminal; or, The first high voltage input terminal is the first high voltage terminal, the second high voltage input terminal is the second high voltage terminal, and the third high voltage input terminal is a third high voltage terminal; or, The first high voltage input terminal and the third high voltage input terminal are the first high voltage terminal, and the second high voltage input terminal is the second high voltage terminal.

In at least one embodiment of the present disclosure, the first high voltage terminal may be used to provide a first high voltage signal, and the second high voltage terminal may be used to provide a second high voltage signal.

Optionally, the first node control circuit includes a fourth transistor;

A control electrode of the fourth transistor is electrically connected to the first control node, a first electrode of the fourth transistor is electrically connected to the fourth high voltage input terminal, and a second electrode of the fourth transistor is electrically connected to the first node;

The first high voltage input terminal, the third high voltage input terminal and the fourth high voltage input terminal are the first high voltage terminal, and the second high voltage input terminal is the second high voltage terminal; or, The first high voltage input terminal and the fourth high voltage input terminal are the first high voltage terminal, and the second high voltage input terminal and the third high voltage input terminal are the second high voltage terminal; or, The first high voltage input terminal and the third high voltage input terminal are the first high voltage terminal, and the second high voltage input terminal and the fourth high voltage input terminal are the second high voltage terminal; or, The first high voltage input terminal is the first high voltage terminal, and the second high voltage input terminal, the third high voltage input terminal and the fourth high voltage input terminal are the second high voltage terminal.

Optionally, the second output circuit includes a fifth transistor, the second pull-down node control circuit includes a sixth transistor, and the first control node control circuit includes a seventh transistor;

A control electrode of the fifth transistor is electrically connected to the pull-down node, a first electrode of the fifth transistor is electrically connected to the driving signal output terminal, and a second electrode of the fifth transistor is electrically connected to the first low voltage input terminal;

A control electrode of the sixth transistor is electrically connected to the second low voltage input terminal, a first electrode of the sixth transistor is electrically connected to the third control node, and a second electrode of the sixth transistor is electrically connected to the pull-down node;

A control electrode of the seventh transistor is electrically connected to the first clock signal terminal, a first electrode of the seventh transistor is electrically connected to the third low voltage input terminal, and a second electrode of the seventh transistor is electrically connected to the first control node;

The first low voltage input terminal and the second low voltage input terminal are the first low voltage terminal; the third low voltage input terminal is the second low voltage terminal; or, The first low voltage input terminal is the first low voltage terminal, and the second low voltage input terminal and the third low voltage input terminal are the second low voltage terminal.

In at least one embodiment of the present disclosure, the first low voltage terminal may be used to provide a first low voltage signal, and the second low voltage terminal may be used to provide a second low voltage signal.

Optionally, the second control node control circuit includes an eighth transistor;

A control electrode of the eighth transistor is electrically connected to the fourth low voltage input terminal, a first electrode of the eighth transistor is electrically connected to the first control node, and a second electrode of the eighth transistor is electrically connected to the second control node;

The fourth low voltage input terminal is the first low voltage terminal or the second low voltage terminal.

Optionally, the third pull-down node control circuit includes a first capacitor, a ninth transistor, a tenth transistor, an eleventh transistor, and a twelfth transistor;

A first terminal of the first capacitor is electrically connected to the first node, and a second terminal of the first capacitor is electrically connected to the second node;

A control electrode of the ninth transistor is electrically connected to the second node, a first electrode of the ninth transistor is electrically connected to the first node, and a second electrode of the ninth transistor is electrically connected to the second clock signal terminal;

A control electrode of the tenth transistor is electrically connected to the second node, a first electrode of the tenth transistor is electrically connected to the pull-down node, and a second electrode of the tenth transistor is electrically connected to the second node;

A control electrode of the eleventh transistor is electrically connected to a fifth low voltage input terminal, a first electrode of the eleventh transistor is electrically connected to the third node, and a second electrode of the eleventh transistor is electrically connected to the second node;

A control electrode of the twelfth transistor is electrically connected to the first clock signal terminal, a first electrode of the twelfth transistor is electrically connected to the start signal terminal, and a second electrode of the twelfth transistor is electrically connected to the third node.

In at least one embodiment of the present disclosure, the fifth low voltage input terminal is the first low voltage terminal or the second low voltage terminal, but not limited thereto.

Optionally, the driving circuit includes a first control node control circuit, a third control node control circuit and a second pull-up node control circuit;

The first control node control circuit is electrically connected to the first control node, and the first control node control circuit is also electrically connected to the third control node, is configured to control to connect the first control node and the first clock signal terminal under the control of the potential of the third control node;

The third control node control circuit is electrically connected to the first clock signal terminal, the start signal terminal, and the third control node, and is configured to control to connect the start signal terminal and the third control node under the control of the first clock signal provided by the first clock signal terminal;

The second pull-up node control circuit is also electrically connected to the first control node or the second control node, the fourth control node, the second clock signal terminal and the first high voltage input terminal, is configured to control the potential of the fourth control node according to the potential of the second control node, and control to connect the second clock signal terminal and the fourth control node under the control of the potential of the first control node or the potential of the second control node, control to connect the fourth control node and the pull-up node under the control of the second clock signal provided by the second clock signal terminal, and maintain the potential of the pull-up node.

Figure 7:
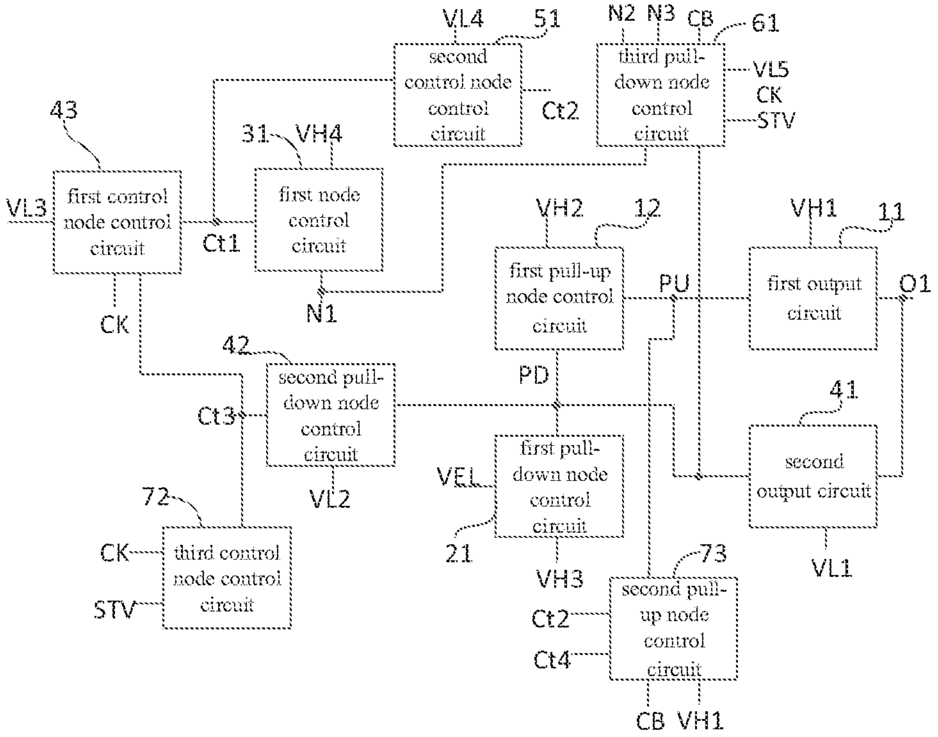
FIG. 7 is the structural diagram of the driving circuit according to an embodiment of the present disclosure.

In at least one embodiment of the present disclosure, as shown in FIG. 7, on the basis of at least one embodiment of the driving circuit shown in FIG. 6, the driving circuit includes a third control node control circuit 72 and a second pull-up node control circuit 73;

The first control node control circuit 43 is also electrically connected to the third control node Ct3, is configured to control to connect the first control node Ct1 and the first clock signal terminal CK under the control of the potential of the third control node Ct3;

The third control node control circuit 72 is electrically connected to the first clock signal terminal CK, the start signal terminal STV and the third control node Ct3 respectively, and is configured to control to connect the start signal terminal STV and the third control node Ct3 under the control of the first clock signal provided by the first clock signal terminal CK;

The second pull-up node control circuit 73 is also electrically connected to the second control node Ct2, the fourth control node Ct4, the second clock signal terminal CB and the first high voltage input terminal VH1, is configured to control the potential of the fourth control node Ct4 according to the potential of the second control node Ct4, control to connect the second clock signal terminal CB and the fourth control node Ct4 under the control of the potential of the second control node Ct2, and control to connect the fourth control node Ct4 and the pull-up node PU under the control of the second clock signal provided by the second clock signal terminal CB, and maintain the potential of the pull-up node PU.

Optionally, the first control node control circuit includes a thirteenth transistor, the third control node control circuit includes a fourteenth transistor, and the second pull-up node control circuit includes a second capacitor, a third capacitor, a fifteenth transistor and a sixteenth transistor;

A control electrode of the thirteenth transistor is electrically connected to the third control node, a first electrode of the thirteenth transistor is electrically connected to the first control node, and a second electrode of the thirteenth transistor is electrically connected to the first clock signal terminal;

A control electrode of the fourteenth transistor is electrically connected to the first clock signal terminal, a first electrode of the fourteenth transistor is electrically connected to the start signal terminal, and a second electrode of the fourteenth transistor is electrically connected to the third control node;

A first terminal of the second capacitor is electrically connected to the second control node, and a second terminal of the second capacitor is electrically connected to the fourth control node;

A first terminal of the third capacitor is electrically connected to the pull-up node, and a second terminal of the third capacitor is electrically connected to the first high voltage input terminal;

A control electrode of the fifteenth transistor is electrically connected to the second control node, a first electrode of the fifteenth transistor is electrically connected to the second clock signal terminal, and a second electrode of the fifteenth transistor is electrically connected to the fourth control node;

A control electrode of the sixteenth transistor is electrically connected to the second clock signal terminal, a first electrode of the sixteenth transistor is electrically connected to the fourth control node, and a second electrode of the sixteenth transistor is connected to the pull-up node.

Figure 8:
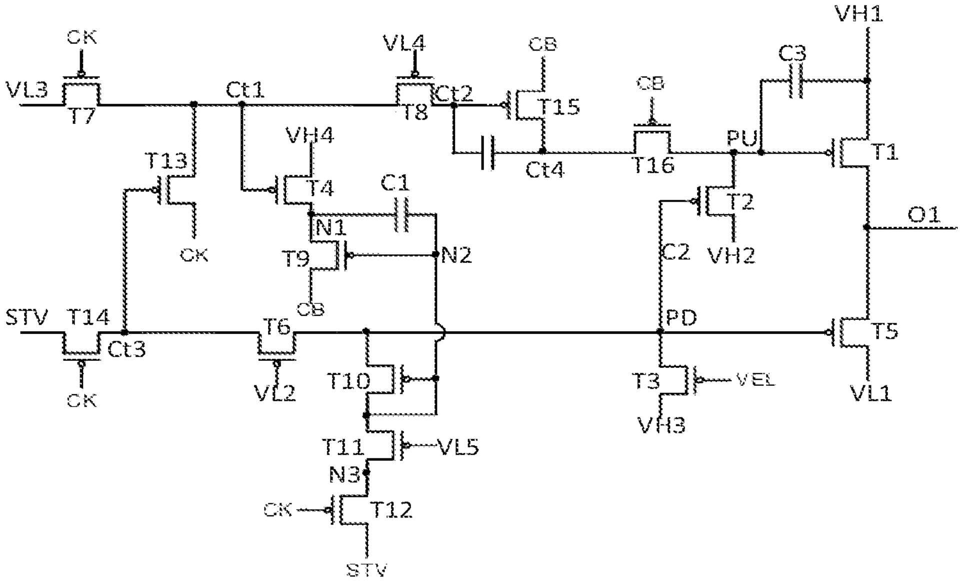
FIG. 8 is the circuit diagram of the driving circuit according to an embodiment of the present disclosure.

As shown in FIG. 8, on the basis of at least one embodiment of the driving circuit shown in FIG. 7, the first output circuit includes a first transistor T1, the first pull-up node control circuit includes a second transistor T2, and the first pull-down node control circuit includes a third transistor T3;

The gate electrode of the first transistor T1 is electrically connected to the pull-up node PU, the source electrode of the first transistor T1 is electrically connected to the first high voltage input terminal VH1, and the drain electrode of the first transistor T1 is electrically connected to the driving signal output terminal O1;

The gate electrode of the second transistor T2 is electrically connected to the pull-down node PD, the source electrode of the second transistor T2 is electrically connected to the second high voltage input terminal VH2, and the drain electrode of the second transistor T2 is electrically connected to the pull-up node PU;

The gate electrode of the third transistor T3 is electrically connected to the pull-down control terminal VEL, the source electrode of the third transistor T3 is electrically connected to the third high voltage input terminal VH3, and the drain electrode of the third transistor T3 is electrically connected to the pull-down node PD;

The first node control circuit includes a fourth transistor T4;

The gate electrode of the fourth transistor T4 is electrically connected to the first control node Ct1, the source electrode of the fourth transistor T4 is electrically connected to the fourth high voltage input terminal VH4, and the drain electrode of the fourth transistor T4 is electrically connected to the first node N1;

The second output circuit includes a fifth transistor T5, the second pull-down node control circuit includes a sixth transistor T6, and the first control node control circuit includes a seventh transistor T7;

The gate electrode of the fifth transistor T5 is electrically connected to the pull-down node PD, the source electrode of the fifth transistor T5 is electrically connected to the driving signal output terminal O1, and the drain electrode of the fifth transistor T5 is electrically connected to the first low voltage input terminal VL1;

The gate electrode of the sixth transistor T6 is electrically connected to the second low voltage input terminal VL2, the source electrode of the sixth transistor T6 is electrically connected to the third control node Ct3, and the drain electrode of the sixth transistor T6 is electrically connected to the pull-down node PD;

The gate electrode of the seventh transistor T7 is electrically connected to the first clock signal terminal CK, the source electrode of the seventh transistor T7 is electrically connected to the third low voltage input terminal VL3, and the drain electrode of the seventh transistor T7 is electrically connected to the first control node Ct1;

The second control node control circuit includes an eighth transistor T8;

The gate electrode of the eighth transistor T8 is electrically connected to the fourth low voltage input terminal VL4, the source electrode of the eighth transistor T8 is electrically connected to the first control node Ct1, and the drain electrode of the eighth transistor T8 is electrically connected to the second The control node Ct2;

The third pull-down node control circuit includes a first capacitor C1, a ninth transistor T9, a tenth transistor T10, an eleventh transistor T11 and a twelfth transistor T12;

The first terminal of the first capacitor C1 is electrically connected to the first node N1, and the second terminal of the first capacitor C1 is electrically connected to the second node N2;

The gate electrode of the ninth transistor T9 is electrically connected to the second node N2, the source electrode of the ninth transistor T9 is electrically connected to the first node N1, and the drain electrode of the ninth transistor T9 is electrically connected to the second clock signal terminal CB;

The gate electrode of the tenth transistor T10 is electrically connected to the second node N2, the source electrode of the tenth transistor T10 is electrically connected to the pull-down node PD, and the drain electrode of the tenth transistor T10 is electrically connected to the second node N2;

The gate electrode of the eleventh transistor T11 is electrically connected to the fifth low voltage input terminal VL5, the source electrode of the eleventh transistor T11 is electrically connected to the third node N3, and the drain electrode of the eleventh transistor T11 is electrically connected to the second node N2;

The gate electrode of the twelfth transistor T12 is electrically connected to the first clock signal terminal CK, the source electrode of the twelfth transistor T12 is electrically connected to the start signal terminal STV, and the drain electrode of the twelfth transistor T12 is electrically connected to the third node N3;

The first control node control circuit includes a thirteenth transistor T13, the third control node control circuit includes a fourteenth transistor T14, and the second pull-up node control circuit includes a second capacitor C2, a third capacitor C3, a fifteenth transistor T15 and a sixteenth transistor T16;

The gate electrode of the thirteenth transistor T13 is electrically connected to the third control node Ct3, the source electrode of the thirteenth transistor T13 is electrically connected to the first control node Ct1, and the drain electrode of the thirteenth transistor T13 is electrically connected to the first clock signal terminal CK;

The gate electrode of the fourteenth transistor T14 is electrically connected to the first clock signal terminal CK, the source electrode of the fourteenth transistor T14 is electrically connected to the start signal terminal STV, and the drain electrode of the fourteenth transistor T14 is electrically connected to the third control node Ct3;

The first terminal of the second capacitor C2 is electrically connected to the second control node Ct2, and the second terminal of the second capacitor C2 is electrically connected to the fourth control node Ct4;

The first terminal of the third capacitor C3 is electrically connected to the pull-up node PU, and the second terminal of the third capacitor C3 is electrically connected to the first high voltage input terminal VH1;

The gate electrode of the fifteenth transistor T15 is electrically connected to the second control node Ct2, the source electrode of the fifteenth transistor T15 is electrically connected to the second clock signal terminal CB, and the drain electrode of the fifteenth transistor T15 is electrically connected to the fourth control node Ct4;

The gate electrode of the sixteenth transistor T16 is electrically connected to the second clock signal terminal CB, the source electrode of the sixteenth transistor T16 is electrically connected to the fourth control node Ct4, and the drain electrode of the sixteenth transistor T16 is electrically connected to the pull-up node PU.

In at least one embodiment shown in FIG. 8, all transistors are p-type transistors, but not limited thereto.

When the driving circuit shown in FIG. 8 according to at least one embodiment of the present disclosure is in operation, due to the parasitic capacitance between the data line, the scan line and the light emitting control line, the data signal on the data line often jumps, so the signals on the scan signal and the light emitting control line will be coupled and changed as the change of the data signal, causing brightness deviation problems such as crosstalk. Therefore, according to the driving circuit shown in FIG. 8, T10 that is a diode is arranged between PD and N2, the potential of the PD is stabilized at a low level by the operation mode of the charge pump, so as to ensure the relative stability of the output signal and prevent the brightness deviation caused by the coupling crosstalk.

Figure 9:
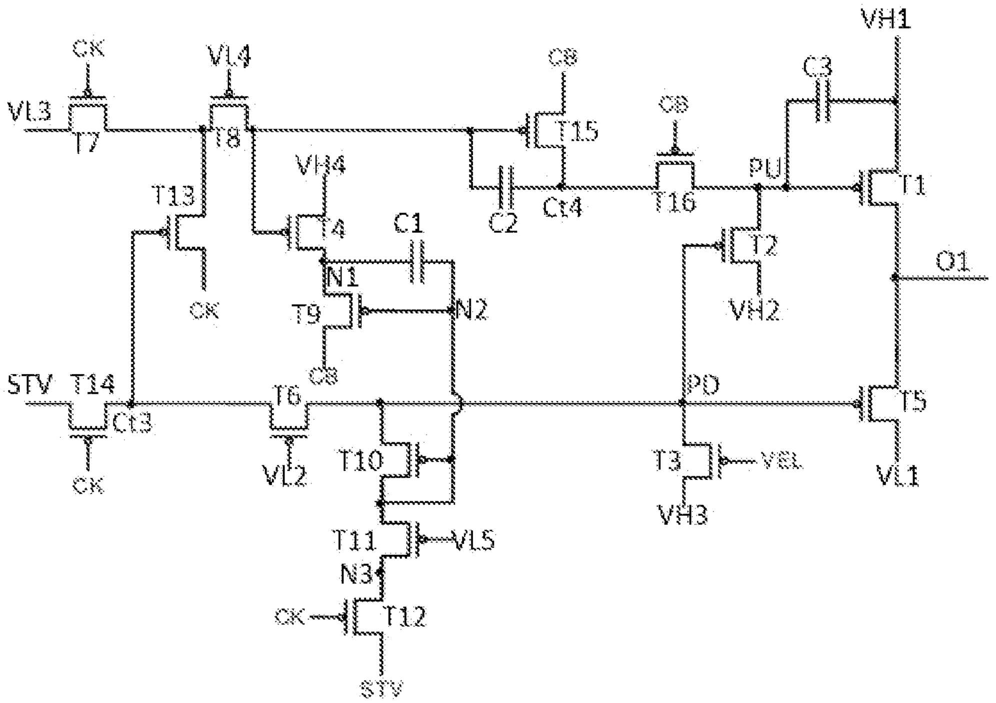
FIG. 9 is the circuit diagram of the driving circuit according to an embodiment of the present disclosure.

The difference between the driving circuit shown in FIG. 9 of at least one embodiment of the present disclosure and the driving circuit shown in FIG. 8 of at least one embodiment of the present disclosure is that T8 is connected between the source electrode of T13 and the gate electrode of T4.

Figure 10:
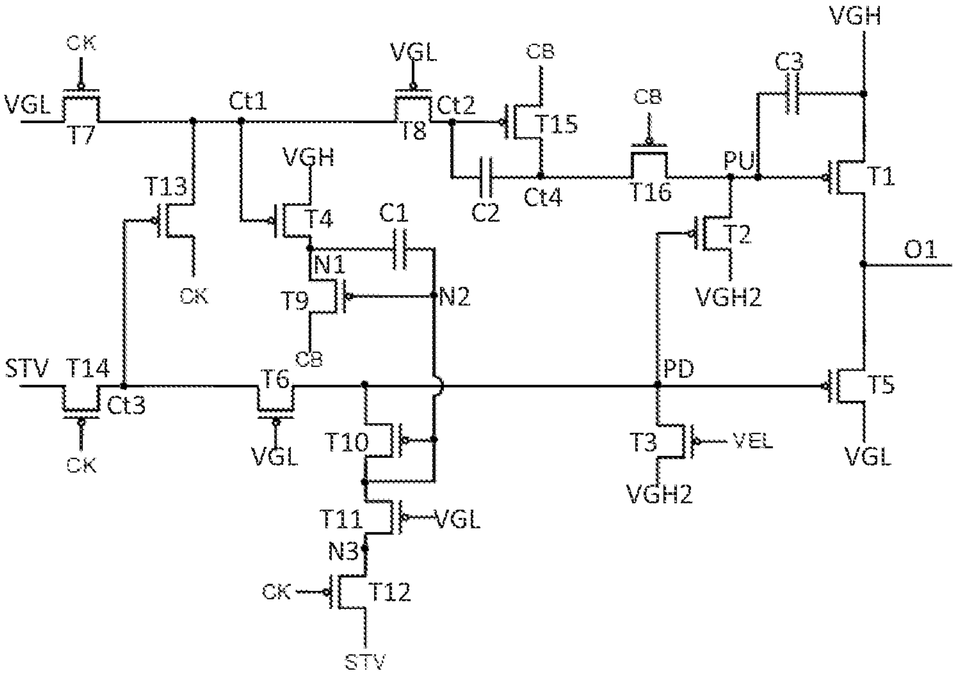
FIG. 10 is a circuit diagram of the driving circuit according to an embodiment of the present disclosure.

As shown in FIG. 10, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL1, VL2, VL3, VL4 and VL5 all provide the first low voltage signal VGL.

Figure 11:
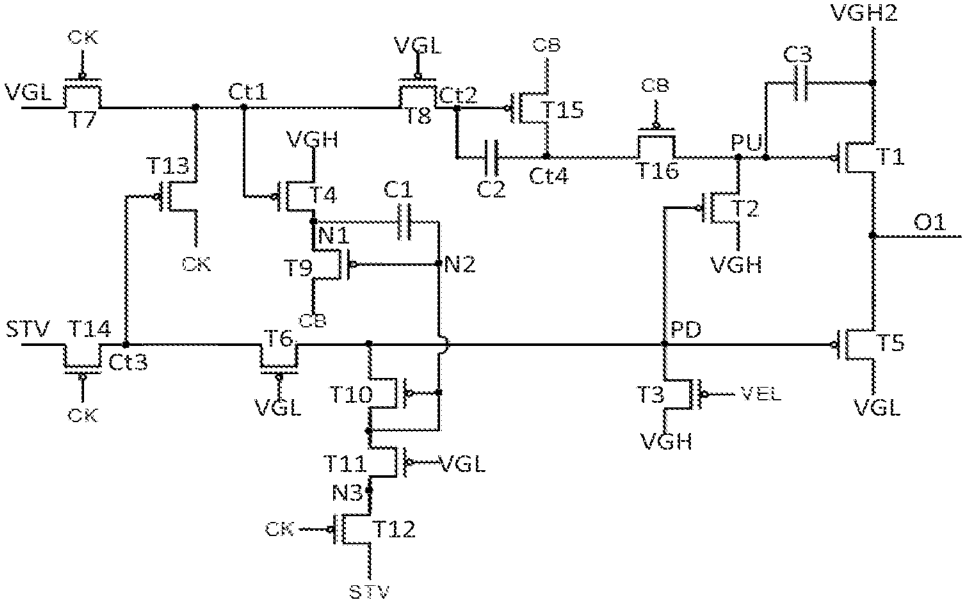
FIG. 11 is the circuit diagram of the driving circuit according to an embodiment of the present disclosure.

As shown in FIG. 11, in at least one embodiment of the driving circuit shown in FIG. 8, VH1 provides the second high voltage signal VGH2, VH2 provides the first high voltage signal VGH, VH3 provides the first high voltage signal VGH, and VH4 provides the first high voltage signal VGH, VL1, VL2, VL3, VL4 and VL5 all provide the first low voltage signal VGL.

Figure 12:
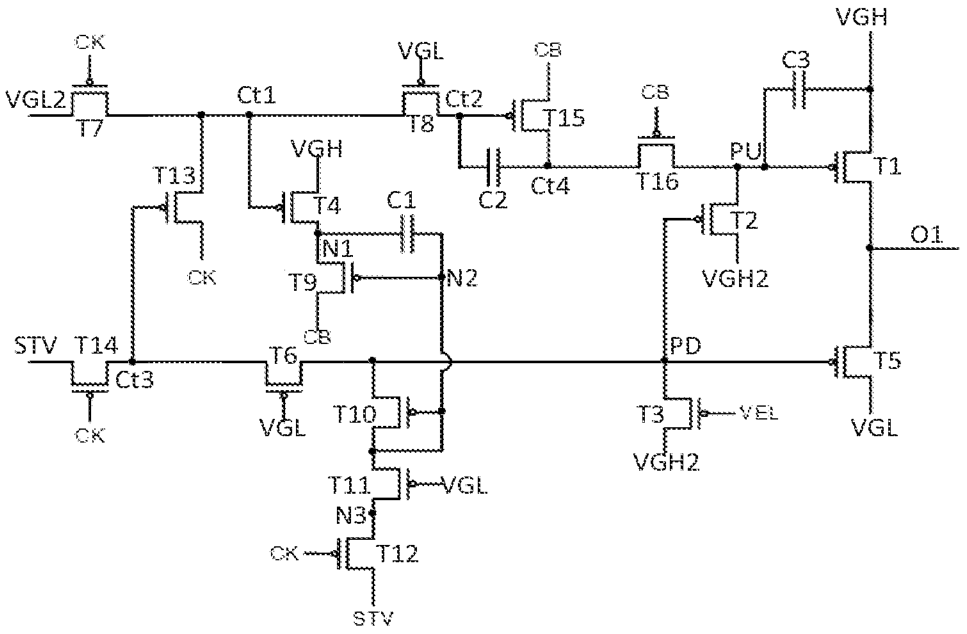
FIG. 12 is the circuit diagram of the driving circuit according to an embodiment of the present disclosure.

As shown in FIG. 12, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL1, VL2, VL4 and VL5 all provide the first low voltage signal VGL, and VL3 provides the second low voltage signal VGL2.

When at least one embodiment of the driving circuit shown in FIG. 12 of the present disclosure is working, the VGL connected to T5 is only used for output, without interference from other transistors, and the wiring is simple. Because the p-type transistor transmits a low level, there is threshold voltage loss, so the voltage value of VGL2 can be set slightly lower than the voltage value of VGL, for example, when the voltage value of VGL is −6V, the voltage value of VGL2 can be −6.5V, but not limited to this.

Figure 13:
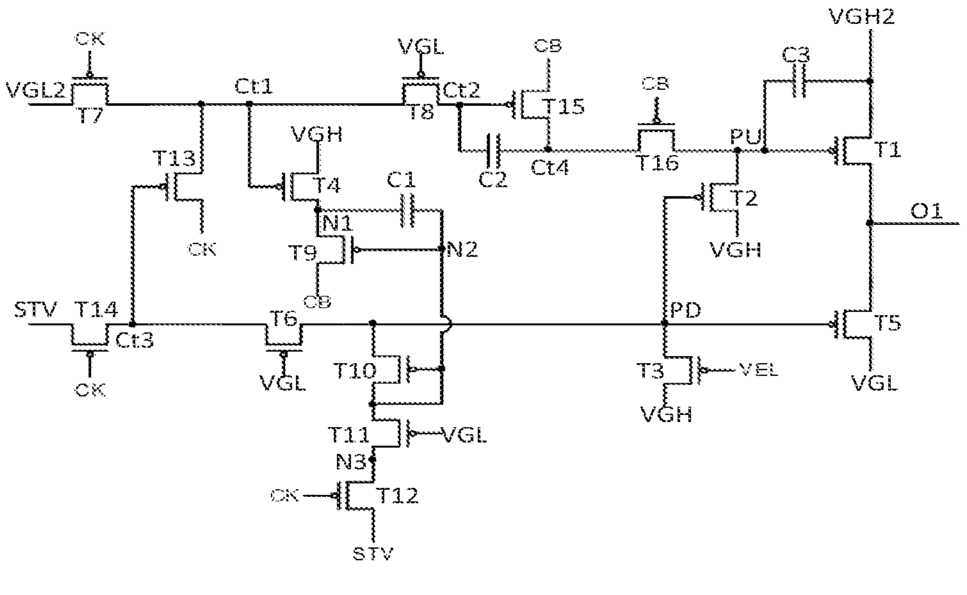
FIG. 13 The circuit diagram of the driving circuit according to an embodiment of the present disclosure.

As shown in FIG. 13, in at least one embodiment of the driving circuit shown in FIG. 8, VH1 provides the second high voltage signal VGH2, VH2 provides the first high voltage signal VGH, VH3 provides the first high voltage signal VGH, and VH4 provides the first high voltage signal VGH, VL1, VL2, VL4 and VL5 all provide the first low voltage signal VGL, and VL3 provides the second low voltage signal VGL2.

Figure 14:
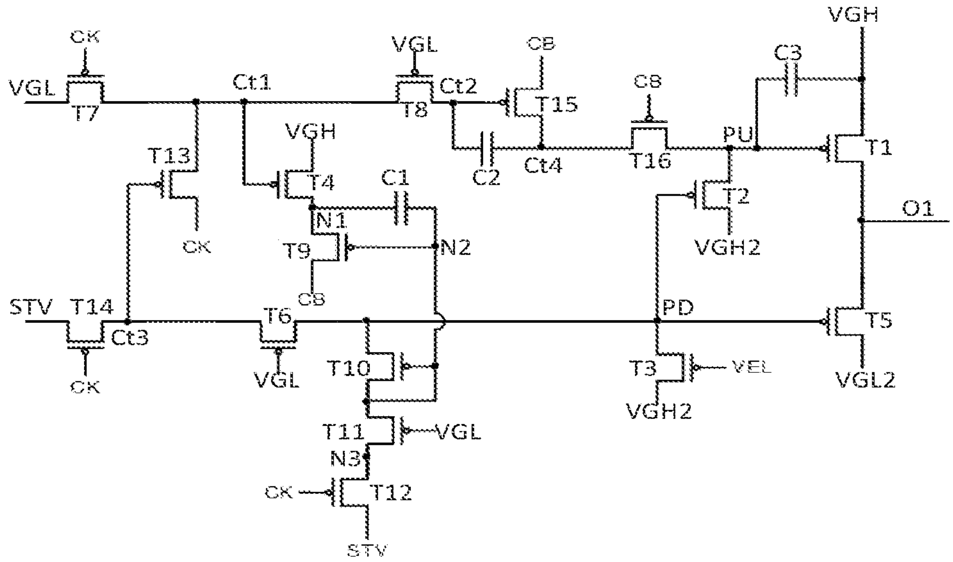
FIG. 14 is the circuit diagram of the driving circuit according to an embodiment of the present disclosure.

As shown in FIG. 14, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL1 provides the second low voltage signal VGL2, and VL2, VL3, VL4 and VL5 all provide the first low voltage signal VGL.

Figure 15:
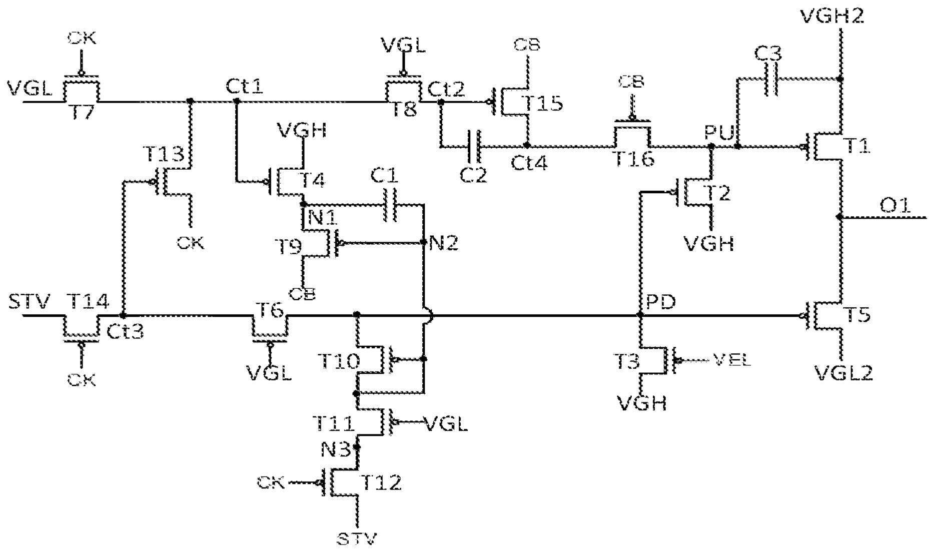
FIG. 15 is the circuit diagram of the driving circuit according to an embodiment of the present disclosure.

As shown in FIG. 15, in at least one embodiment of the driving circuit shown in FIG. 8, VH1 provides the second high voltage signal VGH2, VH2 provides the first high voltage signal VGH, VH3 provides the first high voltage signal VGH, and VH4 provides the first high voltage signal VGH, VL1 provides the second low voltage signal VGL2, and VL2, VL3, VL4 and VL5 all provide the first low voltage signal VGL.

Figure 16:
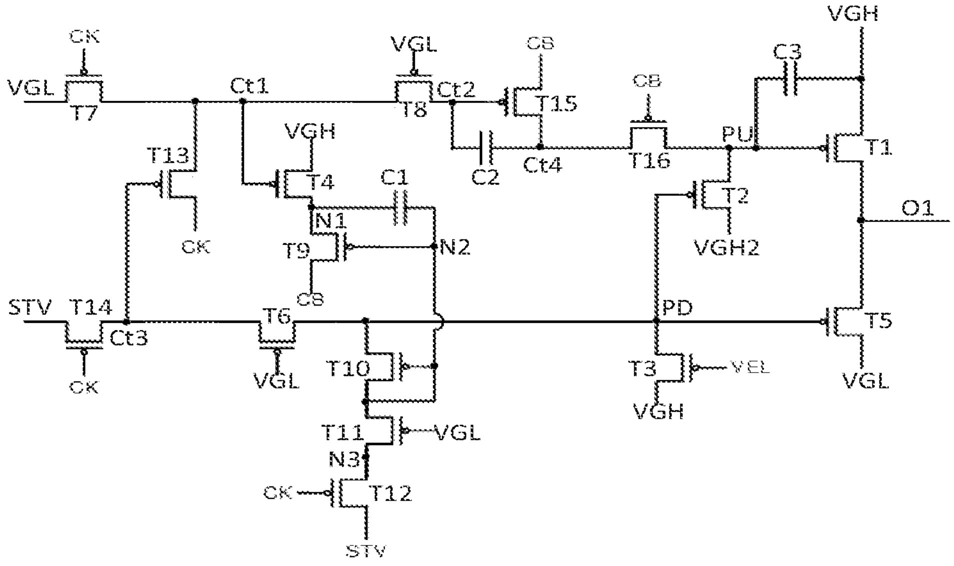
FIG. 16 is the circuit diagram of the driving circuit according to an embodiment of the present disclosure.

As shown in FIG. 16, in at least one embodiment of the driving circuit shown in FIG. 8, VH1 provides the first high voltage signal VGH, VH2 provides the second high voltage signal VGH2, VH3 provides the first high voltage signal VGH, and VH4 provides the first high voltage signal VGH, VL1, VL2, VL3, VL4 and VL5 all provide the first low voltage signal VGL.

Figure 17:
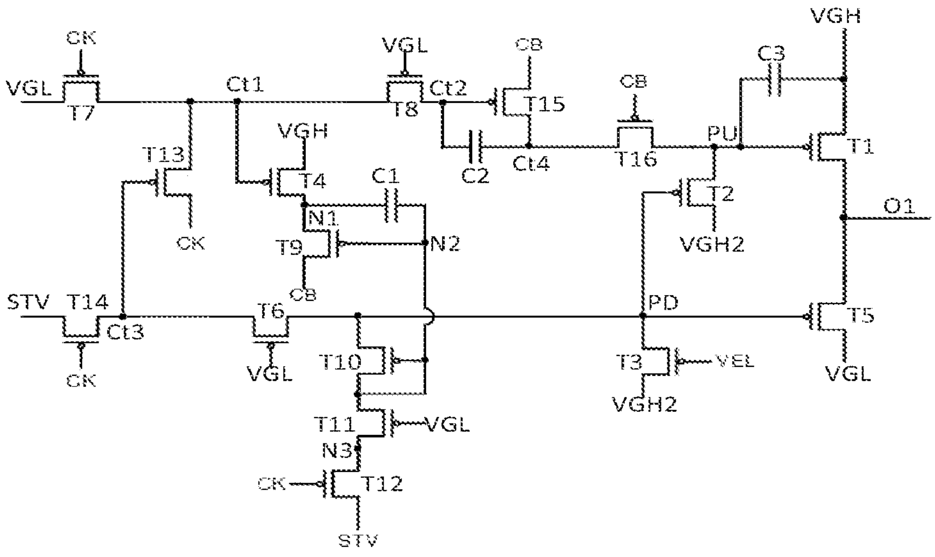
FIG. 17 is the circuit diagram of the driving circuit according to an embodiment of the present disclosure.

As shown in FIG. 17, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL1, VL2, VL3, VL4 and VL5 all provide the first low voltage signal VGL.

Figure 18:
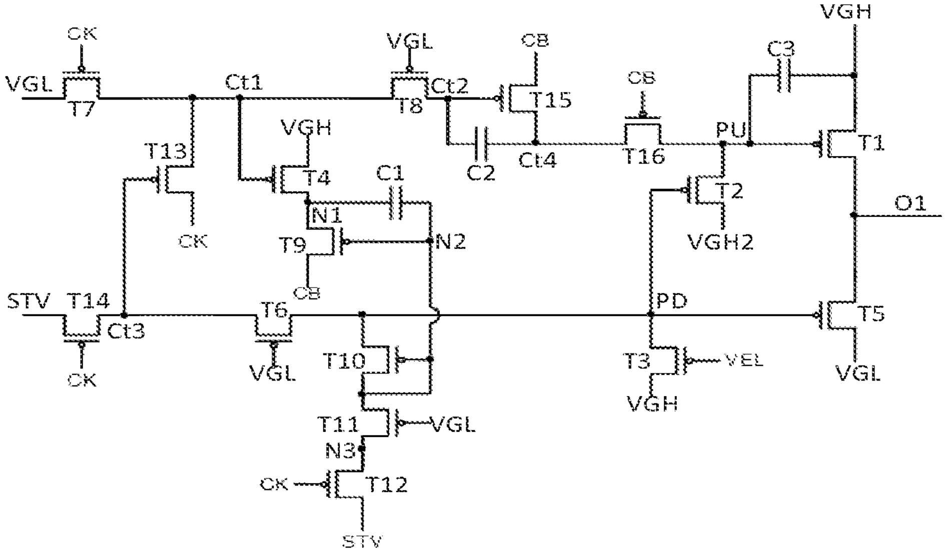
FIG. 18 is the circuit diagram of the driving circuit according to an embodiment of the present disclosure.

As shown in FIG. 18, in at least one embodiment of the driving circuit shown in FIG. 8, VH1 provides the first high voltage signal VGH, VH2 provides the second high voltage signal VGH2, VH3 provides the first high voltage signal VGH, and VH4 provides the second high voltage signal VGH2, VL1, VL2, VL3, VL4 and VL5 all provide the first low voltage signal VGL.

Figure 19:
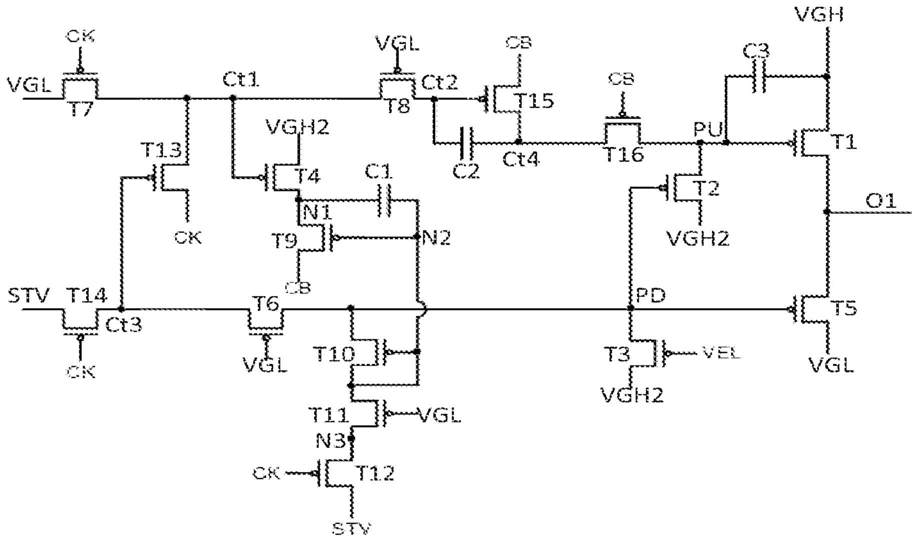
FIG. 19 is a circuit diagram of the driving circuit according to an embodiment of the present disclosure.

As shown in FIG. 19, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the second high voltage signal VGH2, VL1, VL2, VL3, VL4 and VL5 all provide the first low voltage signal VGL.

Figure 20:
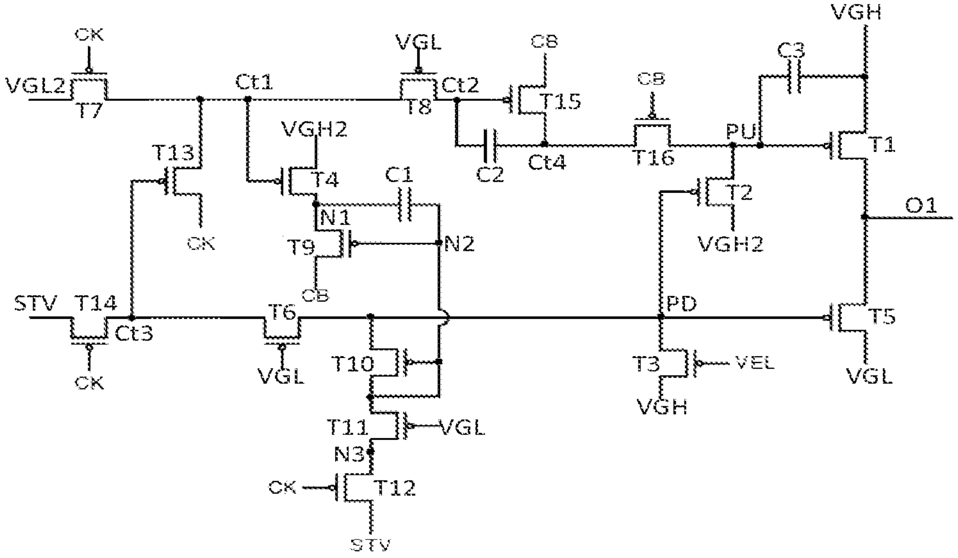
FIG. 20 is the circuit diagram of the driving circuit according to an embodiment of the present disclosure.

As shown in FIG. 20, in at least one embodiment of the driving circuit shown in FIG. 8, VH1 provides the first high voltage signal VGH, VH2 provides the second high voltage signal VGH2, VH3 provides the first high voltage signal VGH1, and VH4 provides the first high voltage signal VGH, VL3 provides the second low voltage signal VGL2, and VL1, VL2, VL4 and VL5 all provide the first low voltage signal VGL.

Figure 21:
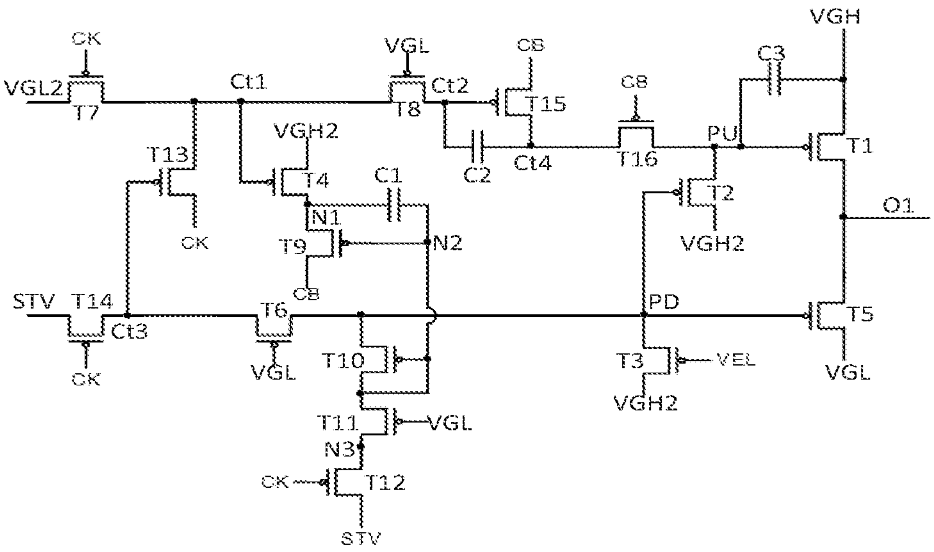
FIG. 21 is the circuit diagram of the driving circuit according to an embodiment of the present disclosure.

As shown in FIG. 21, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL3 provides the second low voltage signal VGL2, and VL1, VL2, VL4 and VL5 all provide the first low voltage signal VGL.

Figure 22:
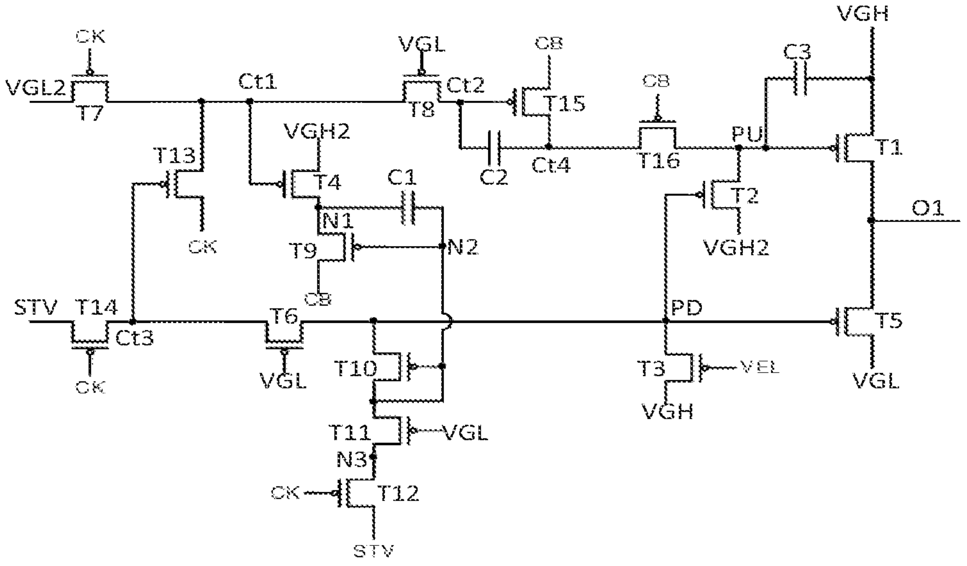
FIG. 22 is the circuit diagram of the driving circuit according to an embodiment of the present disclosure.

As shown in FIG. 22, in at least one embodiment of the driving circuit shown in FIG. 8, VH1 provides the first high voltage signal VGH, VH2 provides the second high voltage signal VGH2, VH3 provides the first high voltage signal VGH, and VH4 provides the second high voltage signal VGH2, VL3 provides the second low voltage signal VGL2, and VL1, VL2, VL4 and VL5 all provide the first low voltage signal VGL.

Figure 23:
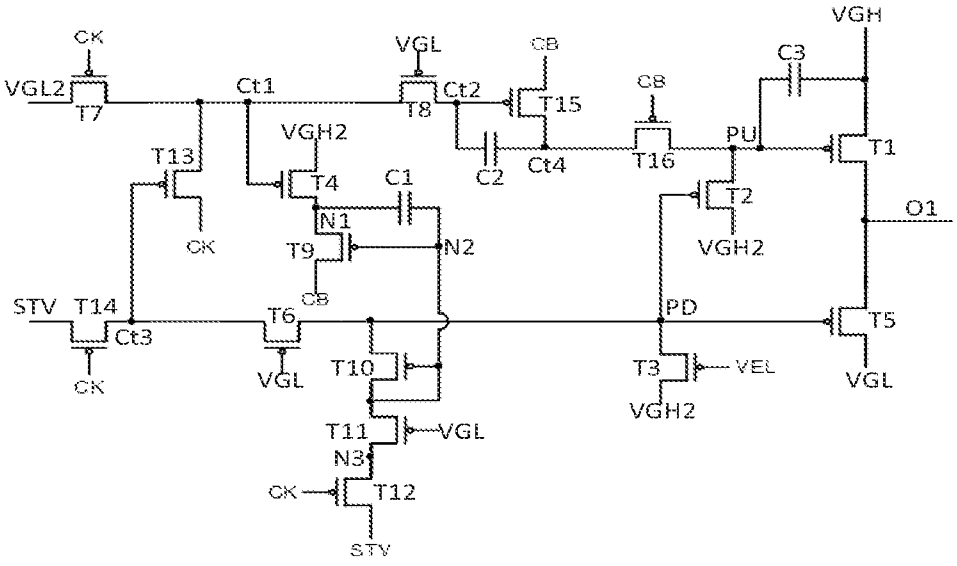
FIG. 23 is the circuit diagram of the driving circuit according to an embodiment of the present disclosure.

As shown in FIG. 23, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the second high voltage signal VGH2, VL3 provides the second low voltage signal VGL2, and VL1, VL2, VL4 and VL5 all provide the first low voltage signal VGL.

Figure 24:
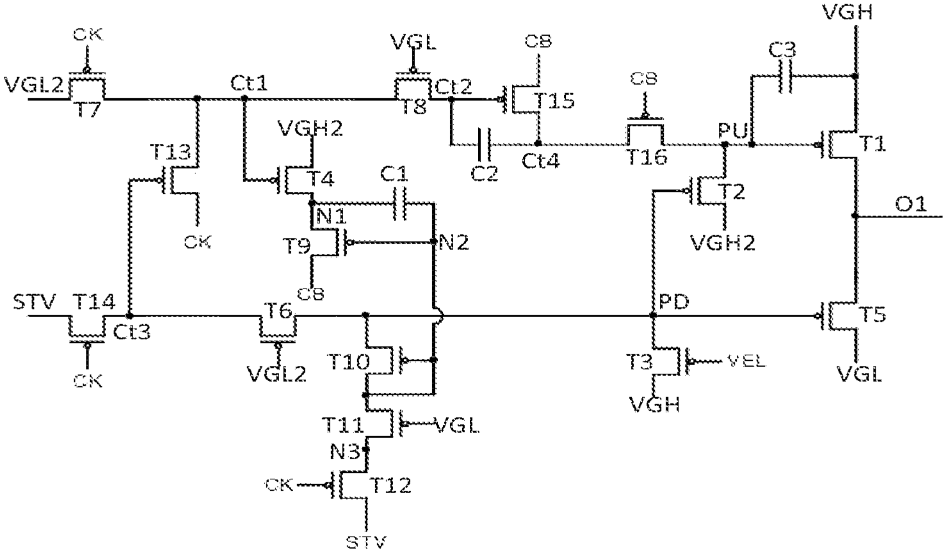
FIG. 24 is the circuit diagram of the driving circuit according to an embodiment of the present disclosure.

As shown in FIG. 24, in at least one embodiment of the driving circuit shown in FIG. 8, VH1 provides the first high voltage signal VGH, VH2 provides the second high voltage signal VGH2, VH3 provides the first high voltage signal VGH, and VH4 provides the first high voltage signal VGH, VL3 provides the second low voltage signal VGL2, VL2 provides the second low voltage signal VGL2, VL1, VL4 and VL5 all provide the first low voltage signal VGL.

Figure 25:
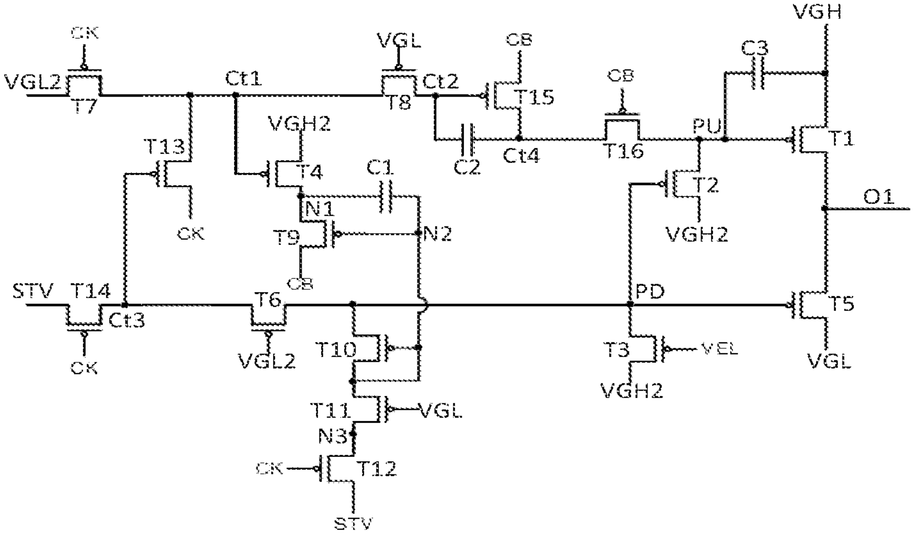
FIG. 25 is the circuit diagram of the driving circuit according to an embodiment of the present disclosure.

As shown in FIG. 25, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the first high voltage signal VGH, VL3 provides the second low voltage signal VGL2, VL2 provides the second low voltage signal VGL2, VL1, VL4 and VL5 all provide the first low voltage signal VGL.

Figure 26:
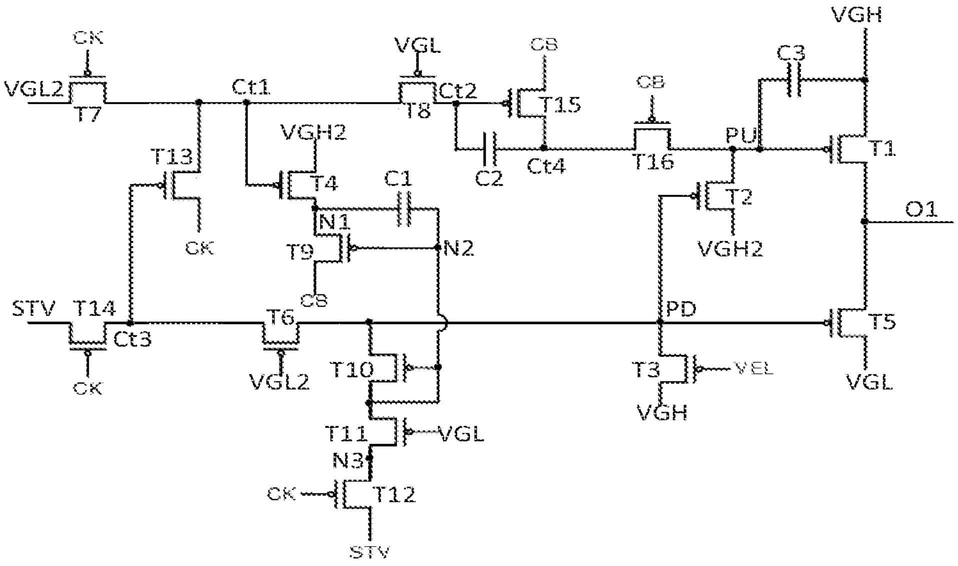
FIG. 26 is the circuit diagram of the driving circuit according to an embodiment of the present disclosure.

As shown in FIG. 26, in at least one embodiment of the driving circuit shown in FIG. 8, VH1 provides the first high voltage signal VGH, VH2 provides the second high voltage signal VGH2, VH3 provides the first high voltage signal VGH, and VH4 provides the second high voltage signal VGH2, VL3 provides the second low voltage signal VGL2, VL2 provides the second low voltage signal VGL2, VL1, VL4 and VL5 all provide the first low voltage signal VGL.

Figure 27:
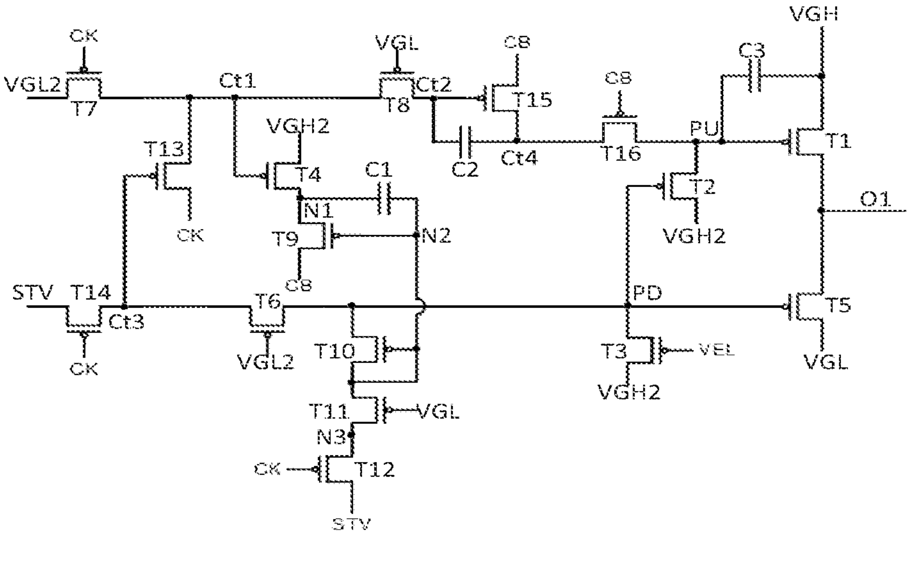
FIG. 27 is the circuit diagram of the driving circuit according to an embodiment of the present disclosure.

As shown in FIG. 27, in at least one embodiment of the driving circuit shown in FIG. 8, VH1 provides the first high voltage signal VGH, VH2 provides the second high voltage signal VGH2, VH3 provides the second high voltage signal VGH2, and VH4 provides the second high voltage signal VGH2, VL3 provides the second low voltage signal VGL2, VL2 provides the second low voltage signal VGL2, VL1, VL4 and VL5 all provide the first low voltage signal VGL.

Figure 28:
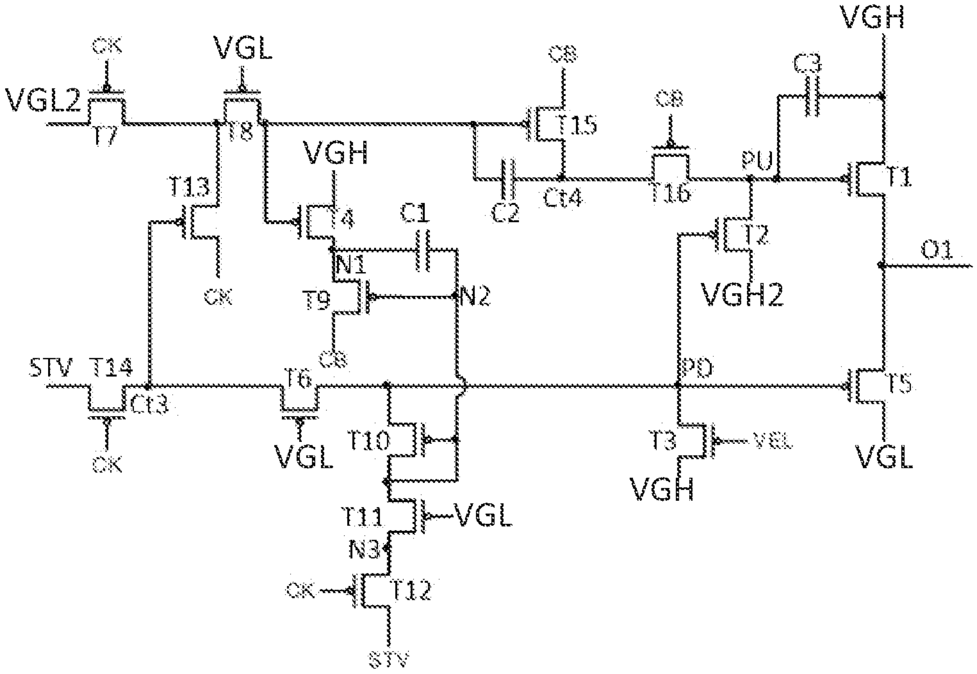
FIG. 28 is the circuit diagram of the driving circuit according to an embodiment of the present disclosure.

As shown in FIG. 28, in at least one embodiment of the driving circuit shown in FIG. 9, VH1 provides the first high voltage signal VGH, VH2 provides the second high voltage signal VGH2, VH3 provides the first high voltage signal VGH, and VH4 provides the first high voltage signal VGH, VL3 provides the second low voltage signal VGL2, VL2 provides the first low voltage signal VGL, VL1, VL4 and VL5 all provide the first low voltage signal VGL.

Figure 29:
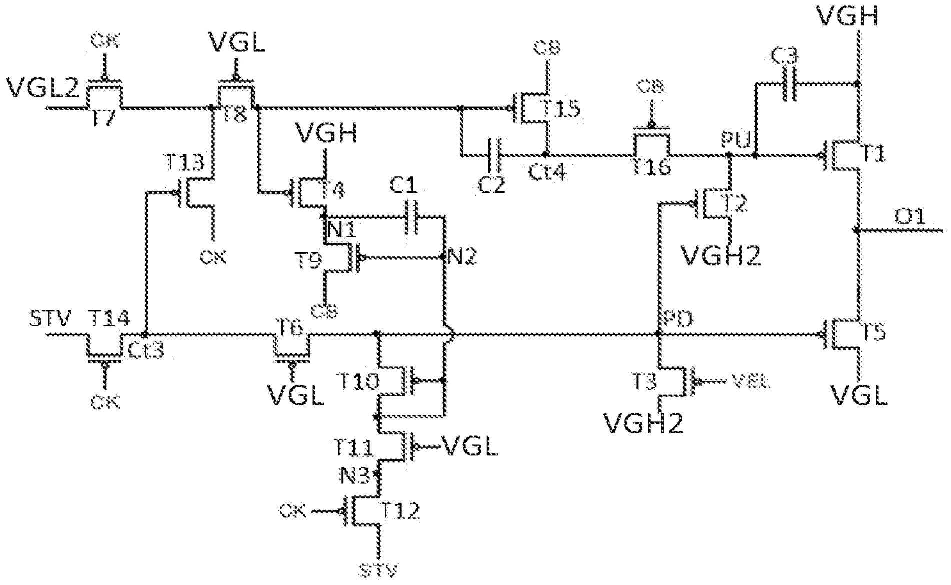
FIG. 29 is the circuit diagram of the driving circuit according to an embodiment of the present disclosure.

As shown in FIG. 29, in at least one embodiment of the driving circuit shown in FIG. 9, VH1 provides the first high voltage signal VGH, VH2 provides the second high voltage signal VGH2, VH3 provides the second high voltage signal VGH2, and VH4 provides the first high voltage signal VGH, VL3 provides the second low voltage signal VGL2, VL2 provides the first low voltage signal VGL, VL1, VL4 and VL5 all provide the first low voltage signal VGL.

Figure 30:
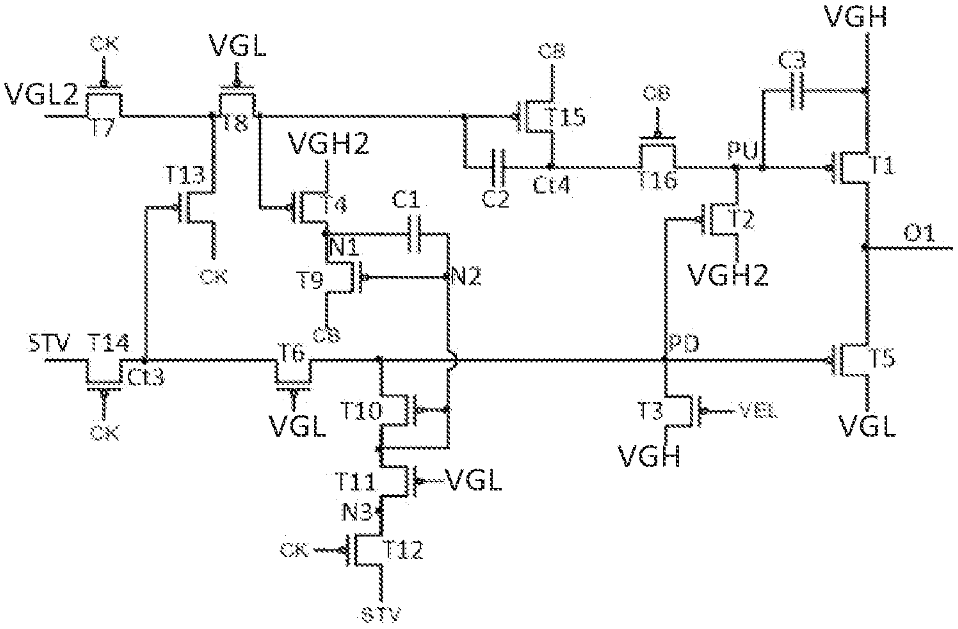
FIG. 30 is the circuit diagram of the driving circuit according to an embodiment of the present disclosure.

As shown in FIG. 30, in at least one embodiment of the driving circuit shown in FIG. 9, VH1 provides the first high voltage signal VGH, VH2 provides the second high voltage signal VGH2, VH3 provides the first high voltage signal VGH, and VH4 provides the second high voltage signal VGH2, VL3 provides the second low voltage signal VGL2, VL2 provides the first low voltage signal VGL, VL1, VL4 and VL5 all provide the first low voltage signal VGL.

Figure 31:
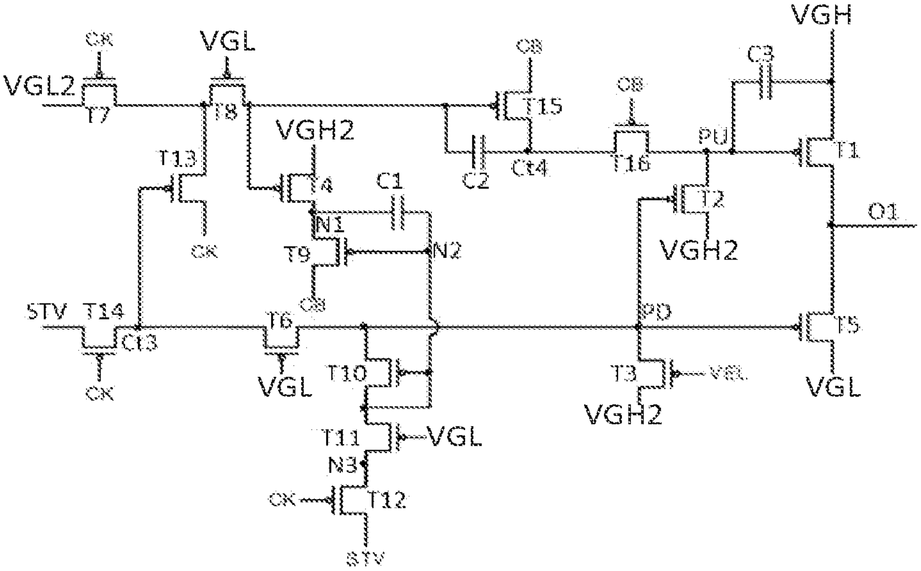
FIG. 31 is the circuit diagram of the driving circuit according to an embodiment of the present disclosure.

As shown in FIG. 31, in at least one embodiment of the driving circuit shown in FIG. 9, VH1 provides the first high voltage signal VGH, VH2 provides the second high voltage signal VGH2, VH3 provides the second high voltage signal VGH2, and VH4 provides the second high voltage signal VGH2, VL3 provides the second low voltage signal VGL2, VL2 provides the first low voltage signal VGL, VL1, VL4 and VL5 all provide the first low voltage signal VGL.

The display panel described in at least one embodiment of the present disclosure includes the above-mentioned driving circuit; the display panel further includes a display driving IC;

The first high voltage input terminal is electrically connected to the first high voltage line, and the second high voltage input terminal is electrically connected to the second high voltage line; the first high voltage line and the second high voltage line are respectively electrically connected to different pins of the display driving IC, the display driving IC is configured to provide the first high voltage signal to the first high voltage line, and the display driving IC is configured to provide the second high voltage signal to the second high voltage line.

In the display panel described in the embodiment of the present disclosure, the first high voltage input terminal is electrically connected to the first high voltage line, the second high voltage input terminal is electrically connected to the second high voltage line, and the first high voltage line is electrically connected to a first pin of the display driving IC, the second high voltage line is electrically connected to a second pin of the display driving IC, and the display driving IC provides the first high voltage signal to the first high voltage line through the first pin, and the display driving IC provides a second high voltage signal to the second high voltage line through the second pin.

Figure 32:
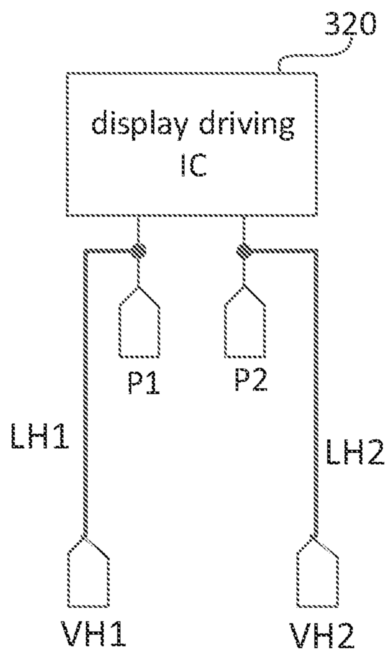
FIG. 32 is the structure diagram of the display panel according to an embodiment of the present disclosure.

As shown in FIG. 32, the display panel includes a display driving IC 320;

The first high voltage input terminal VH1 is electrically connected to the first high voltage line LH1, and the second high voltage input terminal VH2 is electrically connected to the second high voltage line LH2;

The first high voltage line LH1 is electrically connected to the first pin P1 of the display driving IC 320, and the second high voltage line LH2 is electrically connected to the second pin P2 of the display driving IC 320;

The display driving IC 320 is configured to provide the first high voltage signal to the first high voltage line LH1, and the display driving IC 320 is configured to provide the second high voltage signal to the second high voltage line LH2.

The driving circuit described in at least one embodiment of the present disclosure includes a second output circuit, a second pull-down node control circuit, and a first control node control circuit;

The second output circuit is electrically connected to the pull-down node, the driving signal output terminal and the first low voltage input terminal respectively, and is configured to control to connect the driving signal output terminal and the first low voltage input terminal under the control of the potential of the pull-down node;

The second pull-down node control circuit is electrically connected to the third control node, the pull-down node and the second low voltage input terminal, and is configured to control to connect the third control node and the pull-down node under the control of the low voltage signal provided by the second low voltage input terminal;

The first control node control circuit is respectively electrically connected to the first clock signal terminal, the third low voltage input terminal and the first control node, and is configured to control to connect the first control node and the third low voltage input terminal under the control of the first clock signal provided by the first clock signal terminal;

At least two of the first low voltage input terminal, the second low voltage input terminal and the third low voltage input terminal are different from each other.

Optionally, the driving circuit described in at least one embodiment of the present disclosure further includes a second control node control circuit;

The second control node control circuit is respectively electrically connected to a fourth low voltage input terminal, the first control node and the second control node, and is configured to control to connect the first control node and the second control node under the control of the low voltage signal provided by the fourth low voltage input terminal;

The fourth low voltage input terminal is different from at least one of the first low voltage input terminal, the second low voltage input terminal, and the third low voltage input terminal.

Optionally, the driving circuit described in at least one embodiment of the present disclosure further includes a third pull-down node control circuit;

The third pull-down node control circuit is electrically connected to the first node and the second clock signal terminal, and is configured to control to connect or disconnect the first node and the second clock signal terminal;

The third pull-down node control circuit is also electrically connected to the second node, the third node, the fifth low voltage input terminal, the first clock signal terminal and the start signal terminal, and is configured to control to connect the first node and the second clock signal terminal under the control of the potential of the second node, and control the potential of the second node according to the potential of the first node, control to connect the start signal terminal and the third node under the control of the first clock signal provided by the first clock signal terminal, and control to connect the third node and the second node under the control of the low voltage signal provided by the fifth low voltage input terminal, and control to connect the second node and the pull-down node under the control of the potential of the second node;

The fifth low voltage input terminal is different from at least one of the first low voltage input terminal, the second low voltage input terminal, the third low voltage input terminal, and the fourth low voltage input terminal.

The display panel described in at least one embodiment of the present disclosure includes the above-mentioned driving circuit; the display panel further includes a display driving IC;

The first low voltage input terminal is electrically connected to the first low voltage line, the second low voltage input terminal is electrically connected to the second low voltage line, the third low voltage input terminal is electrically connected to the third low voltage line, and the first low voltage line, the second low voltage line, and the third low voltage line are electrically connected to different pins of the display driving IC, and the display driving IC is configured to provide the first low voltage signal for the first low voltage line and provide the second low voltage signal for the second low voltage line and provide the third low voltage signal for the third low voltage line; or, The first low voltage input terminal is electrically connected to the first low voltage line, the second low voltage input terminal and the third low voltage input terminal are both electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, Both the first low voltage input terminal and the second low voltage input terminal are electrically connected to the first low voltage line, the third low voltage input terminal is electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, Both the first low voltage input terminal and the third low voltage input terminal are electrically connected to the first low voltage line, the second low voltage input terminal is electrically connected to the second low voltage line, and the first low voltage line and the second low voltage line are respectively electrically connected to different pins of the display driving IC, and the display driving IC is configured to provide the first low voltage signal for the first low voltage line, and provide the second low voltage signal for the second low voltage line.

Figure 33:
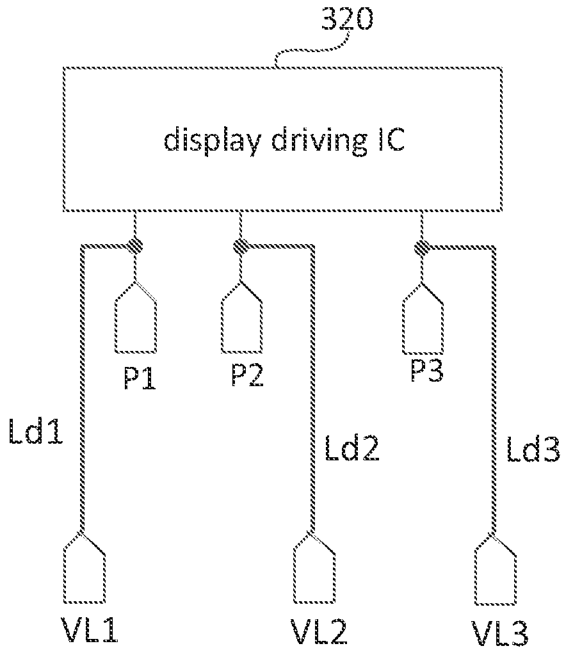
FIG. 33 is the structural diagram of the display panel according to an embodiment of the present disclosure.

As shown in FIG. 33, the display panel includes a display driving IC 320;

The first low voltage input terminal VL1 is electrically connected to the first low voltage line Ld1, the second low voltage input terminal VL2 is electrically connected to the second low voltage line Ld2, and the third low voltage input terminal VL3 is electrically connected to the third low voltage line Ld3, the first low voltage line Ld1 is electrically connected to the first pin P1 of the display driving IC 320, the second low voltage line Ld2 is electrically connected to the second pin P2 of the display driving IC 320, and the third low voltage line Ld3 is electrically connected to the third pin P3 of the display driving IC 320;

The display driving IC 320 is configured to provide the first low voltage signal for the first low voltage line Ld1, provide the second low voltage signal for the second low voltage line Ld2, and provide the third low voltage signal for the third low voltage line Ld3.

Figure 34:
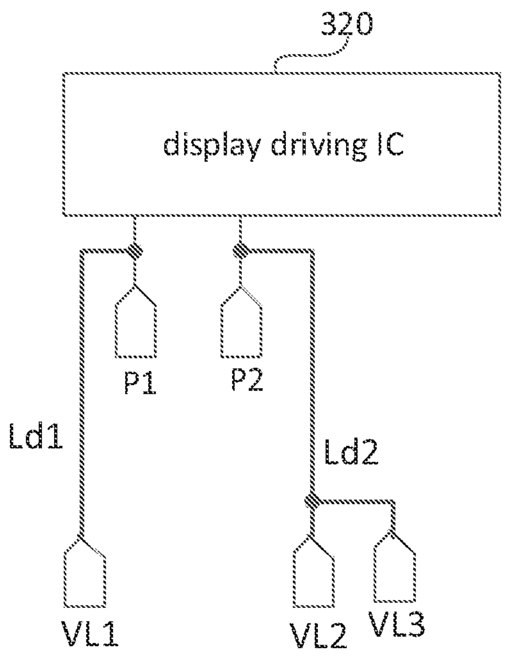
FIG. 34 is the structural diagram of the display panel according to an embodiment of the present disclosure.

As shown in FIG. 34, the display panel includes a display driving IC 320;

The first low voltage input terminal VL1 is electrically connected to the first low voltage line Ld1, and the second low voltage input terminal VL2 and the third low voltage input terminal VL3 are both electrically connected to the second low voltage line Ld2;

The first low voltage line Ld1 is electrically connected to the first pin P1 of the display driving IC 320, and the second low voltage line Ld2 is electrically connected to the second pin P2 of the display driving IC 320;

The display driving IC 320 is configured to provide a first low voltage signal for the first low voltage line Ld1 and provide a second low voltage signal for the second low voltage line Ld2.

Figure 35:
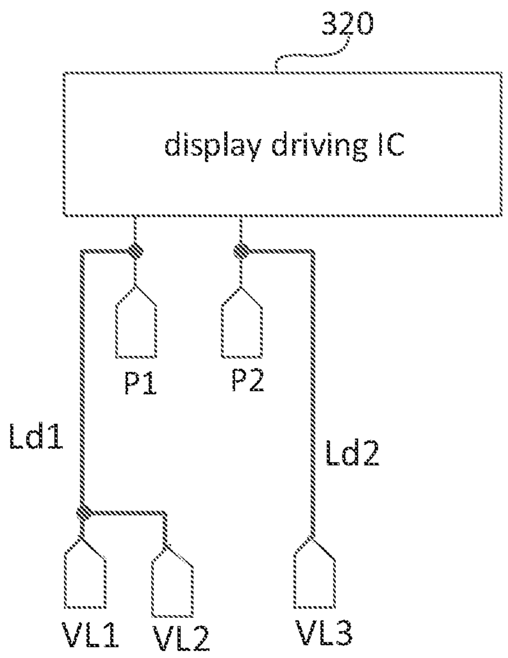
FIG. 35 is the structural diagram of the display panel according to an embodiment of the present disclosure.

As shown in FIG. 35, the display panel includes a display driving IC 320;

Both the first low voltage input terminal VL1 and the second low voltage input terminal VL2 are electrically connected to the first low voltage line Ld1, and the third low voltage input terminal VL3 is electrically connected to the second low voltage line Ld2;

The first low voltage line Ld1 is electrically connected to the first pin P1 of the display driving IC 320, and the second low voltage line Ld2 is electrically connected to the second pin P2 of the display driving IC 320;

The display driving IC 320 is configured to provide a first low voltage signal for the first low voltage line Ld1 and provide a second low voltage signal for the second low voltage line Ld2.

Figure 36:
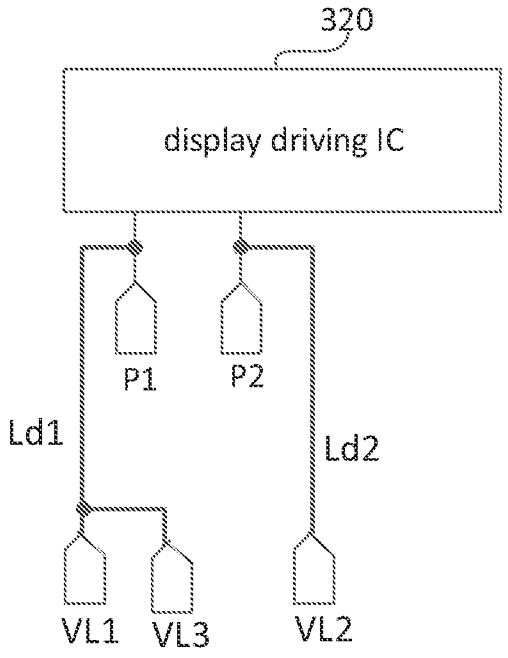
FIG. 36 is the structure diagram of the display panel according to an embodiment of the present disclosure.

As shown in FIG. 36, the display panel includes a display driving IC 320;

Both the first low voltage input terminal VL1 and the third low voltage input terminal VL3 are electrically connected to the first low voltage line Ld1, and the second low voltage input terminal VL2 is electrically connected to the second low voltage line Ld2;

The first low voltage line Ld1 is electrically connected to the first pin P1 of the display driving IC 320, and the second low voltage line Ld2 is electrically connected to the second pin P2 of the display driving IC 320;

The display driving IC 320 is configured to provide a first low voltage signal for the first low voltage line Ld1 and provide a second low voltage signal for the second low voltage line Ld2.

The display device described in the embodiment of the present disclosure includes the above driving circuit.

The display device provided by the embodiments of the present disclosure may be any product or component with a display function, such as a mobile phone, a tablet computer, a television, a monitor, a notebook computer, a digital photo frame, a navigator, and the like.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a first output circuit and a first pull-up node control circuit; wherein the first output circuit is electrically connected to a pull-up node, a first high voltage input terminal and a driving signal output terminal, and is configured to control to connect the first high voltage input terminal and the driving signal output terminal under the control of a potential of the pull-up node;

the first pull-up node control circuit is electrically connected to a pull-down node, a second high voltage input terminal and the pull-up node, and is configured to control to connect the pull-up node and the second high voltage input terminal under the control of a potential of the pull-down node;

the first high voltage input terminal is different from the second high voltage input terminal;

wherein the driving circuit further comprises a first node control circuit and a fourth high voltage input terminal; wherein the first node control circuit is electrically connected to a first node, a first control terminal and the fourth high voltage input terminal, and is configured to control to connect the first node and the fourth high voltage input terminal under the control of a potential of the first control terminal; the first control terminal is a first control node or a second control node;

the fourth high voltage input terminal is different from at least one of the first high voltage input terminal and the second high voltage input terminal;

wherein the first output circuit includes a first transistor, the first pull-up node control circuit includes a second transistor, and the first pull-down node control circuit includes a third transistor;

a control electrode of the first transistor is electrically connected to the pull-up node, a first electrode of the first transistor is electrically connected to the first high voltage input terminal, and a second electrode of the first transistor is electrically connected to the driving signal output terminal;

a control electrode of the second transistor is electrically connected to the pull-down node, a first electrode of the second transistor is electrically connected to the second high voltage input terminal, and a second electrode of the second transistor is electrically connected to the pull-up node;

a control electrode of the third transistor is electrically connected to the pull-down control terminal, a first electrode of the third transistor is electrically connected to the third high voltage input terminal, and a second electrode of the third transistor is electrically connected to the pull-down node;

the first high voltage input terminal is a first high voltage terminal, and the second high voltage input terminal and the third high voltage input terminal are a second high voltage terminal; or, the first high voltage input terminal is the second high voltage terminal, and the second high voltage input terminal and the third high voltage input terminal are the first high voltage terminal; or, the first high voltage input terminal is the first high voltage terminal, the second high voltage input terminal is the second high voltage terminal, and the third high voltage input terminal is a third high voltage terminal; or, the first high voltage input terminal and the third high voltage input terminal are the first high voltage terminal, and the second high voltage input terminal is the second high voltage terminal.

2. The driving circuit according to claim 1, further comprising a first pull-down node control circuit; wherein the first pull-down node control circuit is electrically connected to the pull-down node, a third high voltage input terminal and a pull-down control terminal respectively, and is configured to control to connect the third high voltage input terminal and the pull-down node under the control of a pull-down control signal provided by the pull-down control terminal;

the third high voltage input terminal is different from at least one of the first high voltage input terminal and the second high voltage input terminal.

3. The driving circuit according to claim 1, further comprising a second output circuit, a second pull-down node control circuit, and a first control node control circuit; wherein the second output circuit is electrically connected to the pull-down node, the driving signal output terminal and a first low voltage input terminal respectively, and is configured to control to connect the driving signal output terminal and the first low voltage input terminal under the control of the potential of the pull-down node;

the second pull-down node control circuit is electrically connected to a third control node, the pull-down node and a second low voltage input terminal, and is configured to control to connect the third control node and the pull-down node under the control of a low voltage signal provided by the second low voltage input terminal;

the first control node control circuit is respectively electrically connected to a first clock signal terminal, a third low voltage input terminal and a first control node, and is configured to control to connect the first control node and the third low voltage input terminal under the control of a first clock signal provided by the first clock signal terminal;

at least two of the first low voltage input terminal, the second low voltage input terminal and the third low voltage input terminal are different from each other.

4. The driving circuit according to claim 3, further comprising a second control node control circuit; wherein the second control node control circuit is electrically connected to a fourth low voltage input terminal, the first control node and the second control node respectively, and is configured to control to connect the first control node and the second control node under the control of a low voltage signal provided by the fourth low voltage input terminal, wherein the fourth low voltage input terminal is different from at least one of the first low voltage input terminal, the second low voltage input terminal, and the third low voltage input terminal.

5. The driving circuit according to claim 3, further comprising a third pull-down node control circuit; wherein the third pull-down node control circuit is electrically connected to the first node and a second clock signal terminal respectively, and is configured to control to connect or disconnect the first node and the second clock signal terminal.

6. The driving circuit according to claim 5, wherein the third pull-down node control circuit is also connected to the pull-down node, the second node, the third node, a fifth low voltage input terminal, the first clock signal terminal and a start signal terminal respectively, and is configured to connect the first node and the second clock signal terminal under the control of the potential of the second node, and control the potential of the second node according to the potential of the first node, control to connect the start signal terminal and the third node under the control of the first clock signal provided by the first clock signal terminal, and control to connect the third node and the second node under the control of a low voltage signal provided by the fifth low voltage input terminal, and control to connect the second node and the pull-down node under the control of the potential of the second node, wherein the fifth low voltage input terminal is different from at least one of the first low voltage input terminal, the second low voltage input terminal, or the third low voltage input terminal.

7. The driving circuit according to claim 1, wherein the first node control circuit includes a fourth transistor;

a control electrode of the fourth transistor is electrically connected to the first control node, a first electrode of the fourth transistor is electrically connected to the fourth high voltage input terminal, and a second electrode of the fourth transistor is electrically connected to the first node;

the first high voltage input terminal, the third high voltage input terminal and the fourth high voltage input terminal are the first high voltage terminal, and the second high voltage input terminal is the second high voltage terminal; or, the first high voltage input terminal and the fourth high voltage input terminal are the first high voltage terminal, and the second high voltage input terminal and the third high voltage input terminal are the second high voltage terminal; or, the first high voltage input terminal and the third high voltage input terminal are the first high voltage terminal, and the second high voltage input terminal and the fourth high voltage input terminal are the second high voltage terminal; or, the first high voltage input terminal is the first high voltage terminal, and the second high voltage input terminal, the third high voltage input terminal and the fourth high voltage input terminal are the second high voltage terminal.

8. The driving circuit according to claim 3, wherein the second output circuit includes a fifth transistor, the second pull-down node control circuit includes a sixth transistor, and the first control node control circuit includes a seventh transistor;

a control electrode of the fifth transistor is electrically connected to the pull-down node, a first electrode of the fifth transistor is electrically connected to the driving signal output terminal, and a second electrode of the fifth transistor is electrically connected to the first low voltage input terminal;

a control electrode of the sixth transistor is electrically connected to the second low voltage input terminal, a first electrode of the sixth transistor is electrically connected to the third control node, and a second electrode of the sixth transistor is electrically connected to the pull-down node;

a control electrode of the seventh transistor is electrically connected to the first clock signal terminal, a first electrode of the seventh transistor is electrically connected to the third low voltage input terminal, and a second electrode of the seventh transistor is electrically connected to the first control node;

the first low voltage input terminal and the second low voltage input terminal are the first low voltage terminal; the third low voltage input terminal is the second low voltage terminal; or, the first low voltage input terminal is the first low voltage terminal, and the second low voltage input terminal and the third low voltage input terminal are the second low voltage terminal.

9. The driving circuit according to claim 4, wherein the second control node control circuit includes an eighth transistor;

a control electrode of the eighth transistor is electrically connected to the fourth low voltage input terminal, a first electrode of the eighth transistor is electrically connected to the first control node, and a second electrode of the eighth transistor is electrically connected to the second control node;

the fourth low voltage input terminal is the first low voltage terminal or the second low voltage terminal.

10. The driving circuit according to claim 5, wherein the third pull-down node control circuit includes a first capacitor, a ninth transistor, a tenth transistor, an eleventh transistor, and a twelfth transistor;

a first terminal of the first capacitor is electrically connected to the first node, and a second terminal of the first capacitor is electrically connected to the second node;

a control electrode of the ninth transistor is electrically connected to the second node, a first electrode of the ninth transistor is electrically connected to the first node, and a second electrode of the ninth transistor is electrically connected to the second clock signal terminal;

a control electrode of the tenth transistor is electrically connected to the second node, a first electrode of the tenth transistor is electrically connected to the pull-down node, and a second electrode of the tenth transistor is electrically connected to the second node;

a control electrode of the eleventh transistor is electrically connected to a fifth low voltage input terminal, a first electrode of the eleventh transistor is electrically connected to the third node, and a second electrode of the eleventh transistor is electrically connected to the second node;

a control electrode of the twelfth transistor is electrically connected to the first clock signal terminal, a first electrode of the twelfth transistor is electrically connected to the start signal terminal, and a second electrode of the twelfth transistor is electrically connected to the third node, wherein the fifth low voltage input terminal is the first low voltage terminal or the second low voltage terminal.

11. The driving circuit according to claim 3, wherein the driving circuit includes a first control node control circuit, a third control node control circuit and a second pull-up node control circuit;

the first control node control circuit is electrically connected to the first control node, and the first control node control circuit is also electrically connected to the third control node, is configured to control to connect the first control node and the first clock signal terminal under the control of a potential of the third control node;

the third control node control circuit is electrically connected to the first clock signal terminal, the start signal terminal, and the third control node, and is configured to control to connect the start signal terminal and the third control node under the control of the first clock signal provided by the first clock signal terminal;

the second pull-up node control circuit is also electrically connected to the first control node or the second control node, a fourth control node, the second clock signal terminal and the first high voltage input terminal, is configured to control a potential of the fourth control node according to the potential of the second control node, and control to connect the second clock signal terminal and the fourth control node under the control of the potential of the first control node or the potential of the second control node, control to connect the fourth control node and the pull-up node under the control of the second clock signal provided by the second clock signal terminal, and maintain the potential of the pull-up node.

12. The driving circuit according to claim 11, wherein the first control node control circuit includes a thirteenth transistor, the third control node control circuit includes a fourteenth transistor, and the second pull-up node control circuit includes a second capacitor, a third capacitor, a fifteenth transistor and a sixteenth transistor;

a control electrode of the thirteenth transistor is electrically connected to the third control node, a first electrode of the thirteenth transistor is electrically connected to the first control node, and a second electrode of the thirteenth transistor is electrically connected to the first clock signal terminal;

a control electrode of the fourteenth transistor is electrically connected to the first clock signal terminal, a first electrode of the fourteenth transistor is electrically connected to the start signal terminal, and a second electrode of the fourteenth transistor is electrically connected to the third control node;

a first terminal of the second capacitor is electrically connected to the second control node, and a second terminal of the second capacitor is electrically connected to the fourth control node;

a first terminal of the third capacitor is electrically connected to the pull-up node, and a second terminal of the third capacitor is electrically connected to the first high voltage input terminal;

a control electrode of the fifteenth transistor is electrically connected to the second control node, a first electrode of the fifteenth transistor is electrically connected to the second clock signal terminal, and a second electrode of the fifteenth transistor is electrically connected to the fourth control node;

a control electrode of the sixteenth transistor is electrically connected to the second clock signal terminal, a first electrode of the sixteenth transistor is electrically connected to the fourth control node, and a second electrode of the sixteenth transistor is connected to the pull-up node.

13. A display panel, comprising the driving circuit according to claim 1; wherein the display panel further includes a display driving IC;

the first high voltage input terminal is electrically connected to a first high voltage line, and the second high voltage input terminal is electrically connected to a second high voltage line; the first high voltage line and the second high voltage line are respectively electrically connected to different pins of the display driving IC, the display driving IC is configured to provide a first high voltage signal to the first high voltage line, and the display driving IC is configured to provide a second high voltage signal to the second high voltage line.

14. A display device, including the driving circuit according to claim 1.

15. A driving circuit, comprising a second output circuit, a second pull node control circuit and a first control node control circuit; wherein the second output circuit is electrically connected to a pull-down node, a driving signal output terminal and a first low voltage input terminal respectively, and is configured to control to connect the driving signal output terminal and the first low voltage input terminal under the control of a potential of the pull-down node;

the second pull-down node control circuit is electrically connected to a third control node, the pull-down node and a second low voltage input terminal, and is configured to control to connect the third control node and the pull-down node under the control of a low voltage signal provided by the second low voltage input terminal;

the first control node control circuit is respectively electrically connected to a first clock signal terminal, a third low voltage input terminal and a first control node, and is configured to control to connect the first control node and the third low voltage input terminal under the control of a first clock signal provided by the first clock signal terminal;

at least two of the first low voltage input terminal, the second low voltage input terminal and the third low voltage input terminal are different from each other;

wherein the driving circuit further comprises a second control node control circuit; wherein the second control node control circuit is respectively electrically connected to a fourth low voltage input terminal, the first control node and the second control node, and is configured to control to connect the first control node and the second control node under the control of a low voltage signal provided by the fourth low voltage input terminal;

the fourth low voltage input terminal is different from at least one of the first low voltage input terminal, the second low voltage input terminal, and the third low voltage input terminal.

16. The driving circuit according to claim 15, further comprising a third pull-down node control circuit; wherein the third pull-down node control circuit is electrically connected to a first node and a second clock signal terminal, and is configured to control to connect or disconnect the first node and the second clock signal terminal;

the third pull-down node control circuit is also electrically connected to a second node, a third node, a fifth low voltage input terminal, the first clock signal terminal and a start signal terminal, and is configured to control to connect the first node and the second clock signal terminal under the control of a potential of the second node, and control the potential of the second node according to the potential of the first node, control to connect the start signal terminal and the third node under the control of the first clock signal provided by the first clock signal terminal, and control to connect the third node and the second node under the control of a low voltage signal provided by the fifth low voltage input terminal, and control to connect the second node and the pull-down node under the control of the potential of the second node;

the fifth low voltage input terminal is different from at least one of the first low voltage input terminal, the second low voltage input terminal, the third low voltage input terminal, or the fourth low voltage input terminal.

17. A display panel, comprising the driving circuit according to claim 15; wherein the display panel further includes a display driving IC;

the first low voltage input terminal is electrically connected to a first low voltage line, the second low voltage input terminal is electrically connected to a second low voltage line, the third low voltage input terminal is electrically connected to a third low voltage line, and the first low voltage line, the second low voltage line, and the third low voltage line are electrically connected to different pins of the display driving IC, and the display driving IC is configured to provide a first low voltage signal for the first low voltage line, provide a second low voltage signal for the second low voltage line and provide a third low voltage signal for the third low voltage line; or, the first low voltage input terminal is electrically connected to the first low voltage line, the second low voltage input terminal and the third low voltage input terminal are both electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, both the first low voltage input terminal and the second low voltage input terminal are electrically connected to the first low voltage line, the third low voltage input terminal is electrically connected to the second low voltage line, and the first low voltage line and the second low voltage line are respectively electrically connected to different pins of the display driving IC, the display driving IC is configured to provide the first low voltage signal for the first low voltage line, and provide the second low voltage signal for the second low voltage line; or, both the first low voltage input terminal and the third low voltage input terminal are electrically connected to the first low voltage line, the second low voltage input terminal is electrically connected to the second low voltage line, and the first low voltage line and the second low voltage line are respectively electrically connected to different pins of the display driving IC, and the display driving IC is configured to provide the first low voltage signal for the first low voltage line, and provide the second low voltage signal for the second low voltage line.

* * * * *